United States Patent
Morinaga et al.

(10) Patent No.: US 7,076,150 B2
(45) Date of Patent: Jul. 11, 2006

(54) INFORMATION TRANSMITTING DEVICE AND METHOD, INFORMATION TERMINAL DEVICE AND INFORMATION TERMINAL RECEIVING METHOD, DIGITAL BROADCAST RECEIVING DEVICE AND METHOD, AND OUTPUT TIME CALCULATING DEVICE AND METHOD

(75) Inventors: Takeo Morinaga, Kanagawa (JP); Keiji Yuzawa, Saitama (JP); Atsushi Kagami, Tokyo (JP); Iwao Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1093 days.

(21) Appl. No.: 09/840,420

(22) Filed: Apr. 23, 2001

(65) Prior Publication Data

US 2002/0015400 A1 Feb. 7, 2002

(30) Foreign Application Priority Data

Apr. 24, 2000 (JP) ............................. 2000-122215

(51) Int. Cl.
*H04N 5/91* (2006.01)
(52) U.S. Cl. ............................. 386/65; 386/83; 386/95
(58) Field of Classification Search .................. 386/65, 386/68, 81, 66, 98, 95, 125, 83–84; 348/423.1
See application file for complete search history.

(56) References Cited

U.S. PATENT DOCUMENTS

| | | | | | |
|---|---|---|---|---|---|
| 5,838,873 | A | * | 11/1998 | Blatter et al. .................. | 386/95 |
| 5,859,949 | A | * | 1/1999 | Yanagihara .................... | 386/68 |
| 5,953,483 | A | * | 9/1999 | Van Gestel et al. ........... | 386/65 |
| 6,011,899 | A | * | 1/2000 | Ohishi et al. .................. | 386/98 |
| 6,031,960 | A | * | 2/2000 | Lane ............................. | 386/68 |
| 6,892,022 | B1 | * | 5/2005 | Bonfiglio et al. ............. | 386/65 |

* cited by examiner

*Primary Examiner*—Vincent F. Boccio
(74) *Attorney, Agent, or Firm*—Frommer Lawrence & Haug LLP; William S. Frommer; Thomas F. Presson

(57) ABSTRACT

It is an object to deliver contents in a different time from a real time through a digital artificial satellite and reproduce a program at a correct time, thereby transmitting information about contents for a long time by utilizing a limited time or transmitting information about contents in a small band. There is prepared a dummy packet including an adaptation field having the value of a dummy PCR for restoring a real time and time ratio information of a transfer time and the real time. During receipt, time information during output is obtained from the dummy PCR and the time ratio information. The time information during the output is added as a time stamp to a TS packet and is stored in a storage device such as a hard disk drive. During reproduction, data are read from the storage device by referring to the time stamp added during the recording. Consequently, the information about the contents transmitted in a different time base from the real time can be reproduced in a correct time base.

12 Claims, 18 Drawing Sheets

Fig. 8

| | value | No. of Bits |
|---|---|---|
| adaptation_field(){ | | |
|     adaptation_field_length= | 183 | 8 |
|     flags : | | |
|         discontinuity_indicator= | 0 | 1 |
|         random_access_indicator= | 0 | 1 |
|         elementary_stream_priority_indicator= | 0 | 1 |
|         PCR_flag= | 1 | 1 |
|         OPCR_flag= | 0 | 1 |
|         splicing_point_flag= | 0 | 1 |
|         transport_private_data_flag= | 0 | 1 |
|         adaptation_field_extension_flag= | 0 | 1 |
|     PCR : | | |
|         program_clock_reference_base= | x | 33 |
|         reserved= | 0 | 6 |
|         program_clock_reference_extension= | 0 | 9 |
|     stuffing : | | |
|         for(i=0; i<n; i++){ | | |
|             stuffing_Byte | 0 | 8 |
|         } | | |

Fig. 9

|  | value | No. of Bits |
|---|---|---|
| adaptation_field(){ | | |
|     adaptation_field_length= | 183 | 8 |
|     flags : | | |
|         discontinuity_indicator= | 0 | 1 |
|         random_access_indicator= | 0 | 1 |
|         elemtary_stream_priority_indicator= | 0 | 1 |
|         PCR_flag= | 0 | 1 |
|         OPCR_flag= | 0 | 1 |
|         splicing_point_flag= | 0 | 1 |
|         transport_private_data_flag= | 1 | 1 |
|         adaptation_field_extension_flag= | 0 | 1 |
|     transport_private_data : | | |
|         transport_private_data_length= | 7 | 8 |
|         Dummy PCR: | | |
|         dummy_program_clock_reference_base= | x | 33 |
|         dummy_reserved= | 0 | 6 |
|         dummy_program_clock_reference_extension= | 0 | 9 |
|         Dummy Ratio : | | |
|         output_ratio_int= | x | 5 |
|         output_ratio_decimal= | x | 12 |
|         output_ratio_reserved= | 0 | 7 |
|     stuffing : | | |
|         for(i=0: i<n: i++){ | | |
|             stuffing_Byte | 0 | 8 |
|         } | | |

Fig. 11

| TIME | INPUT PACKET REACH TIME | | DUMMY PCR | RATIO | OUTPUT TIME (TIME STAMP) | |
|---|---|---|---|---|---|---|
| 14 | irt(0)(6) | ←14 | R_P(0)(6) | | ort(0)(6) | ←28 |
| 12 | irt(0)(5) | ←12 | R_P(0)(5) | | ort(0)(5) | ←24 |
| 10 | irt(0)(4) | ←10 | R_P(0)(4) | | ort(0)(4) | ←20 |
| 8 | irt(0)(3) | ←8 | R_P(0)(3) | | ort(0)(3) | ←16 |
| 6 | irt(0)(2) | ←6 | R_P(0)(2) | | ort(0)(2) | ←12 |
| 4 | irt(0)(1) | ←4 | R_P(0)(1) | | ort(0)(1) | ←8 |
| 2 | irt(0)(0) | ←2 | R_P(0)(0) | | ort(0)(0) | ←4 |
| 0 | idt(0) | ←0 | D_P(0) | pcr←0  ratio←2 | odt(0) | ←0 |

$\Delta 2$, $\Delta 1$

Fig. 13
| TIME | INPUT PACKET REACH TIME | | DUMMY PCR | RATIO | OUTPUT TIME (TIME STAMP) | |
|---|---|---|---|---|---|---|
| 30 | irt(1)(6) | ←30 R_P(1)(6) | | | ort(1)(6) | ←60 |
| 28 | irt(1)(5) | ←28 R_P(1)(5) | | | ort(1)(5) | ←56 |
| 26 | irt(1)(4) | ←26 R_P(1)(4) | | | ort(1)(4) | ←52 |
| 24 | irt(1)(3) | ←24 R_P(1)(3) | | | ort(1)(3) | ←48 |
| 22 | irt(1)(2) | ←22 R_P(1)(2) | | | ort(1)(2) | ←44 |
| 20 | irt(1)(1) | ←20 R_P(1)(1) | | | ort(1)(1) | ←40 |
| 18 | irt(1)(0) | ←18 R_P(1)(0) | | | ort(1)(0) | ←36 |
| 16 | idt(1) | ←16 D_P(1) | pcr←32 | ratio←2 | odt(1) | ←32 |
| 14 | irt(0)(6) | ←14 R_P(0)(6) | | | ort(0)(6) | ←28 |
| 12 | irt(0)(5) | ←12 R_P(0)(5) | | | ort(0)(5) | ←24 |
| 10 | irt(0)(4) | ←10 R_P(0)(4) | | | ort(0)(4) | ←20 |
| 8 | irt(0)(3) | ←8 R_P(0)(3) | | | ort(0)(3) | ←16 |
| 6 | irt(0)(2) | ←6 R_P(0)(2) | | | ort(0)(2) | ←12 |
| 4 | irt(0)(1) | ←4 R_P(0)(1) | | | ort(0)(1) | ←8 |
| 2 | irt(0)(0) | ←2 R_P(0)(0) | | | ort(0)(0) | ←4 |
| 0 | idt(0) | ←0 D_P(0) | pcr←0 | ratio←2 | odt(0) | ←0 |
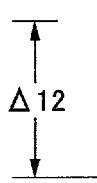
$\Delta 12$, $\Delta 11$
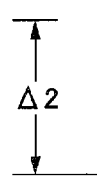
$\Delta 2$, $\Delta 1$

Fig. 16

| TIME | INPUT PACKET REACH TIME | | DUMMY PCR | RATIO | OUTPUT TIME (TIME STAMP) | |
|---|---|---|---|---|---|---|
| 18 | irt(1)(2) ←18 | R_P(1)(2) | | | ort(1)(2) | ←9 |
| 17 | | | | | | |
| 16 | irt(1)(1) ←16 | R_P(1)(1) | | | ort(1)(1) | ←8 |
| 15 | | | | | | |
| 14 | irt(1)(0) ←14 | R_P(1)(0) | | | ort(1)(0) | ←7 |
| 13 | | | | | | |
| 12 | idt1 ←12 | D_P(1) | pcr←6 | ratio←$\frac{1}{2}$ | odt(1) | ←6 |
| 11 | | | | | | |
| 10 | irt(0)(4) ←10 | R_P(0)(4) | | | ort(0)(4) | ←5 |
| 9 | | | | | | |
| 8 | irt(0)(3) ←8 | R_P(0)(3) | | | ort(0)(3) | ←4 |
| 7 | | | | | | |
| 6 | irt(0)(2) ←6 | R_P(0)(2) | | | ort(0)(2) | ←3 |
| 5 | | | | | | |
| 4 | irt(0)(1) ←4 | R_P(0)(1) | | | ort(0)(1) | ←2 |
| 3 | | | | | | |
| 2 | irt(0)(0) ←2 | R_P(0)(0) | | | ort(0)(0) | ←1 |
| 1 | | | | | | |
| 0 | idt0 ←0 | D_P(0) | pcr←0 | ratio←$\frac{1}{2}$ | odt(0) | ←0 |

US 7,076,150 B2

INFORMATION TRANSMITTING DEVICE AND METHOD, INFORMATION TERMINAL DEVICE AND INFORMATION TERMINAL RECEIVING METHOD, DIGITAL BROADCAST RECEIVING DEVICE AND METHOD, AND OUTPUT TIME CALCULATING DEVICE AND METHOD

BACKGROUND OF THE INVENTION

1. Field of the Invention

The present invention relates to an information transmitting device and method, an information terminal device and an information terminal receiving method, a digital broadcast receiving device and method, and an output time calculating device and method which are suitably used for a system for delivering data on contents by utilizing an empty band of a transponder which is caused by the completion of an ordinary digital BS (Broadcast Satellite) broadcast, for example.

2. Description of the Related Art

In the digital BS broadcast, programs including digital video data, digital audio data and other information have been broadcast by using MPEG (Moving Picture Coding Experts Group) 2-TS (Transport Stream). In the MPEG2-TS, programs for a plurality of channels can be multiplexed into one carrier and can be transmitted. For example, eight transponders having a transmission band of 30 Mbps are mounted on an artificial satellite (BS-4 succeeding artificial satellite) carrying out the digital BS broadcast. One transponder can transmit six channels in an SDTV (Standard Definition Television) broadcast and two channels in an HDTV (High Definition Television) broadcast.

In some of ordinary programs broadcast in the digital BS broadcast, the time zone for broadcasting is restricted to the day. For this reason, when the ordinary broadcast is completed at night, an empty band is generated in the transponder. Therefore, there has been proposed that data on contents are delivered by effectively utilizing the empty band of the transponder which is generated after the completion of the broadcast.

In other words, the data on the contents are transmitted from a broadcasting station to a receiver of each home through the BS artificial satellite by utilizing the empty band of the transponder which is generated after the completion of the ordinary broadcast at night. The data on the contents are received by the receiver of each home. The receiver of each home comprises a storage device such as a hard disk drive. The data on the contents thus received are once stored in the storage device. The data on the contents stored in the storage device can be reproduced later by a user. When the data on the contents stored in the storage device are reproduced, the data on the contents are read from the storage device of a receiving terminal of each home and an image thereof is projected onto a television receiver of each home.

Such a delivery service for the data on the contents utilizes the empty band generated by the completion of the ordinary broadcast. Therefore, there is an advantage that the data on the contents can be delivered at a low cost. There can be proposed various data on the contents to be delivered, for example, video data such as a movie or a drama. Such a delivery service for the data on the contents can also be utilized as a delivery service for a video on demand or a music.

Such a delivery service for the data on the contents utilizes the empty band of the transponder after the completion of the ordinary program broadcast, thereby transferring the data. Therefore, a time zone in which the data on the contents can be delivered is restricted depending on a time required for the ordinary program broadcast. Moreover, a band which can be maintained for transmitting the data on the contents is limited to the empty band of the transponder while the ordinary broadcast is completed. For this reason, it is considered that the data on the contents cannot be delivered within a time in which the empty band is generated in the transponder after the completion of the ordinary broadcast or a sufficient band cannot be maintained to deliver the data on the contents in the empty band of the transponder.

In such a delivery service for the data on the contents, it has been proposed that the data are transmitted at a higher speed than a real time in order to shorten a time required for delivering the data on the contents or the data are transmitted at a lower speed than the real time in order to maintain a sufficient band to transmit the data on the contents.

More specifically, it is supposed that a time zone in which the ordinary broadcast is not carried out takes four hours, for example, from one o'clock at night to five o'clock in the morning. In this case, if a time required for delivering the data on the contents is four hours or less, it is possible to transmit the data on the contents in a real time for four hours from one o'clock at night to five o'clock in the morning in which the ordinary broadcast is completed.

However, in the case in which the time required for delivering the data on the contents is eight hours in a real time, for example, the data on the contents cannot be delivered completely for four hours from one o'clock at night to five o'clock in the morning in which the ordinary broadcast is completed.

Thus, in the case in which the time required for transferring the data on the contents cannot be maintained sufficiently, the data on the contents are transferred at a speed which is a double of the real time, for example. When the data on the contents are transmitted at the speed which is a double of the real time, for example, the data on the contents which are transferred for eight hours in the real time, for example, can be transmitted in four hours. Accordingly, even if the time required for delivering the data on the contents is eight hours in the real time, for example, a transfer speed is doubled so that the data on the contents can be completely delivered for four hours from one o'clock at night to five o'clock in the morning in which the ordinary broadcast is completed.

As described above, moreover, eight transponders having a transmission band of 30 Mbps are mounted on the digital BS artificial satellite and one transponder can transmit six channels in the SDTV broadcast and two channels in the HDTV broadcast. For example, it is assumed that the data on the contents are delivered by utilizing a time at which a program for the SDTV broadcast is ended. In this case, if the data on the contents for the SDTV equivalent to the program which has been broadcast are to be delivered, the data on the contents can be exactly transferred in a real time by utilizing an empty band. However, if the data on the contents of the HDTV are to be delivered, a sufficient empty band is not generated on the transponder through the completion of the program which has been broadcast for the SDTV so that the data on the contents cannot be transferred.

Thus, in the case in which a sufficient band for transferring the data on the contents cannot be maintained, the data on the contents are transferred at a lower speed than the real time. For example, if the transfer speed of the data on the contents of the HDTV for one hour in the real time is reduced to a quarter and the same data are transferred, the transmission band is reduced to a quarter. Consequently, the data on the contents for the HDTV can be transferred in the empty band of the transponder which is generated by the completion of the program which has been broadcast for the SDTV.

For example, moreover, it is assumed that data on two contents for the SDTV are to be delivered by utilizing the ending time of a program which is being broadcast for the SDTV. If the data on the contents are to be delivered in the real time, it is impossible to simultaneously deliver the data on two contents by utilizing an empty band generated by the completion of the program which is being broadcast for one SDTV.

In this case, a transfer speed for information about the contents is reduced to a half. When the transfer speed is reduced to a half, a transmission band is reduced to a half. Consequently, the data on contents for two SDTVs can be transferred at the same time by utilizing the empty band of the transponder which is generated by the completion of the program which is being broadcast for one of the SDTVs.

For example, furthermore, it is assumed that an empty band of the transponder for 10 Mbps is maintained. On the other hand, it is assumed that the data on the contents to be transmitted have a band of 8 Mbps. In this case, a null packet is usually inserted for the transmission. Consequently, a band of 2 Mbps is wasted. If the transfer speed of the data on the contents can be changed, the data can be transferred without causing such a waste.

In such a system that the data on the contents are to be transferred by utilizing the empty band of the transponder while a broadcast is completed and an empty band is generated in a transponder at night, thus, the data on the contents for a long time can be transferred in a limited time through data transmission at a higher speed than a real time. Moreover, the data on the contents in a wide band can be transferred in a limited transmission band or data on a plurality of contents can be transferred at the same time through data transmission at a lower speed than the real time.

However, when the data are transferred at a different speed from the real time, time information is lost so that a time base cannot be restored. For this reason, there is a problem in that a time cannot be set on the basis of a PCR (Program Clock Reference) sent in a TS packet to reproduce a program.

SUMMARY OF THE INVENTION

Accordingly, it is an object of the present invention to provide an information transmitting device and method, an information terminal device and an information terminal receiving method, a digital broadcast receiving device and receiving method, and an output time calculating device and method which can restore a correct time base to reproduce a program even if a stream of an MPEG2 is transmitted at a different speed from a real time.

The present invention provides an information transmitting device for multiplexing and transmitting data including predetermined contents, comprising:

means for converting a time base of data including contents to be transmitted;

means for generating time information based on the converted time base and causing the data to include the time information; and means for transmitting the data on the contents which include the time information.

The present invention provides an information terminal device for receiving data including predetermined contents delivered from a transmitting side, comprising:

means for detecting time information from the received data;

means for converting the detected time information into output time information indicative of a timing for outputting the predetermined contents;

means for recording at least the predetermined contents and the output time information; and means for controlling an output of the contents read from the recording means based on the output time information.

The present invention provides a digital broadcast receiving device for receiving a broadcast signal, comprising:

means for extracting digital data including predetermined contents from the received broadcast signal;

means for detecting time information from the extracted digital data;

means for converting the detected time information into output time information indicative of a timing for outputting the predetermined contents;

means for recording at least the predetermined contents and the output time information; and means for controlling an output of the contents read from the recording means based on the output time information.

The present invention provides an information transmitting method for multiplexing and transmitting data including predetermined contents, comprising the steps of:

converting a time base of data including contents to be transmitted;

generating time information based on the converted time base and causing the data to include the time information; and transmitting the data on the contents which include the time information.

The present invention provides an information terminal receiving method for receiving data including predetermined contents delivered from a transmitting side, comprising the steps of:

detecting time information from the received data;

converting the detected time information into output time information indicative of a timing for outputting the predetermined contents;

recording at least the predetermined contents and the output time information; and controlling an output of the contents based on the output time information.

The present invention provides a digital broadcast receiving method for receiving a broadcast signal, comprising the steps of:

extracting digital data including predetermined contents from the received broadcast signal;

detecting time information from the extracted digital data;

converting the detected time information into output time information indicative of a timing for outputting the predetermined contents;

recording at least the predetermined contents and the output time information; and controlling read of the predetermined contents based on the output time information.

The present invention provides an output time calculating device for receiving data including predetermined contents delivered from a transmitting side, detecting time information from the received data and calculating output time information from the detected time information, comprising:

means for latching an arrival time of a dummy packet including dummy reference time information and time ratio information; and means for multiplying a difference between the arrival time of the latched dummy packet and an arrival time of an input packet by the time ratio information, thereby calculating output time information of the packet.

The present invention provides an output time calculating device for receiving data including predetermined contents delivered from a transmitting side, detecting time information from the received data and calculating output time information from the detected time information, comprising:

means for latching an arrival time of a packet including dummy reference time information and time ratio information; and means for multiplying a difference between the arrival time of the latched dummy packet and an arrival time of an input packet by the time ratio information, thereby calculating output time information of the packet, and acquiring continuous dummy packets and calibrating the output time information of the packet based on a difference in the dummy reference time information included in the continuous dummy packets.

The present invention provides an output time calculating method for receiving data including predetermined contents delivered from a transmitting side, detecting time information from the received data and calculating output time information from the detected time information, comprising the steps of:

latching an arrival time of a dummy packet including dummy reference information and time ratio information; and multiplying a difference between the arrival time of the latched dummy packet and an arrival time of an input packet by the time ratio information, thereby calculating output time information of the packet.

The present invention provides an output time calculating method for receiving data including predetermined contents delivered from a transmitting side, detecting time information from the received data and calculating output time information from the detected time information, comprising the steps of:

latching an arrival time of a dummy packet including dummy reference information and time ratio information; and multiplying a difference between the arrival time of the latched dummy packet and an arrival time of an input packet by the time ratio information, thereby calculating output time information of the packet, and acquiring continuous dummy packets and calibrating the output time information of the packet based on a difference in the dummy reference information included in the continuous dummy packets.

The dummy packet including an adaptation field having a value of a dummy PCR for restoring a real time and time ratio information about a transfer time to the real time is prepared.

During receipt, time information for outputting based on the real time is obtained from the dummy PCR of the dummy packet and the time ratio information. The time information for outputting based on the real time is added as a time stamp to a TS packet and is stored in a storage device such as a hard disk drive. During reproduction, data are read from the storage device by referring to the time stamp added during recording. Consequently, it is possible to reproduce, on a correct time base, data on contents transferred on a different time base from the real time.

Alternatively, the TS packet having a time stamp added thereto is stored in the storage device such as a hard disk drive during receipt. During reproduction, time information for outputting based on the real time is obtained from the dummy PCR of the dummy packet and the time ratio information, and the reproduction is carried out in a timing of a time thus obtained. Consequently, it is possible to reproduce, on a correct time base, data on contents transferred on a different time base from the real time.

Thus, the data on the contents can be transmitted at a different speed from the real time. Therefore, the data on the contents for a long time can be transmitted by utilizing a limited time or the data on the contents can be transmitted within a small band.

Moreover, the time information for reproduction based on the real time can be obtained with a simple structure by latching the reach time of a dummy packet and multiplying a difference between the reach time of the dummy packet thus latched and the reach time of an input packet by time ratio information.

Referring to the time information during reproduction based on the real time, moreover, the reach time of the dummy packet is latched, the difference between the reach time of the dummy packet thus latched and the reach time of the input packet is multiplied by the time ratio information to calculate the output time of the packet. In addition, a continuous dummy packet is acquired and the output time of the packet is calibrated based on a difference between the dummy PCRs included in the continuous dummy packets. Consequently, an error is not accumulated so that precision can be enhanced.

BRIEF DESCRIPTION OF THE DRAWINGS

FIG. 8 is a schematic diagram to be used for explaining an adaptation field;

FIG. 9 is a schematic diagram to be used for explaining the adaptation field;

FIG. 11 is a schematic diagram to be used for explaining an example of the time calculating section;

FIG. 13 is a schematic diagram to be used for explaining yet another example of the time calculating section;

FIG. 16 is a schematic diagram to be used for explaining a further example of the time calculating section;

DETAILED DESCRIPTION OF THE PREFERRED EMBODIMENT

Figure 1:
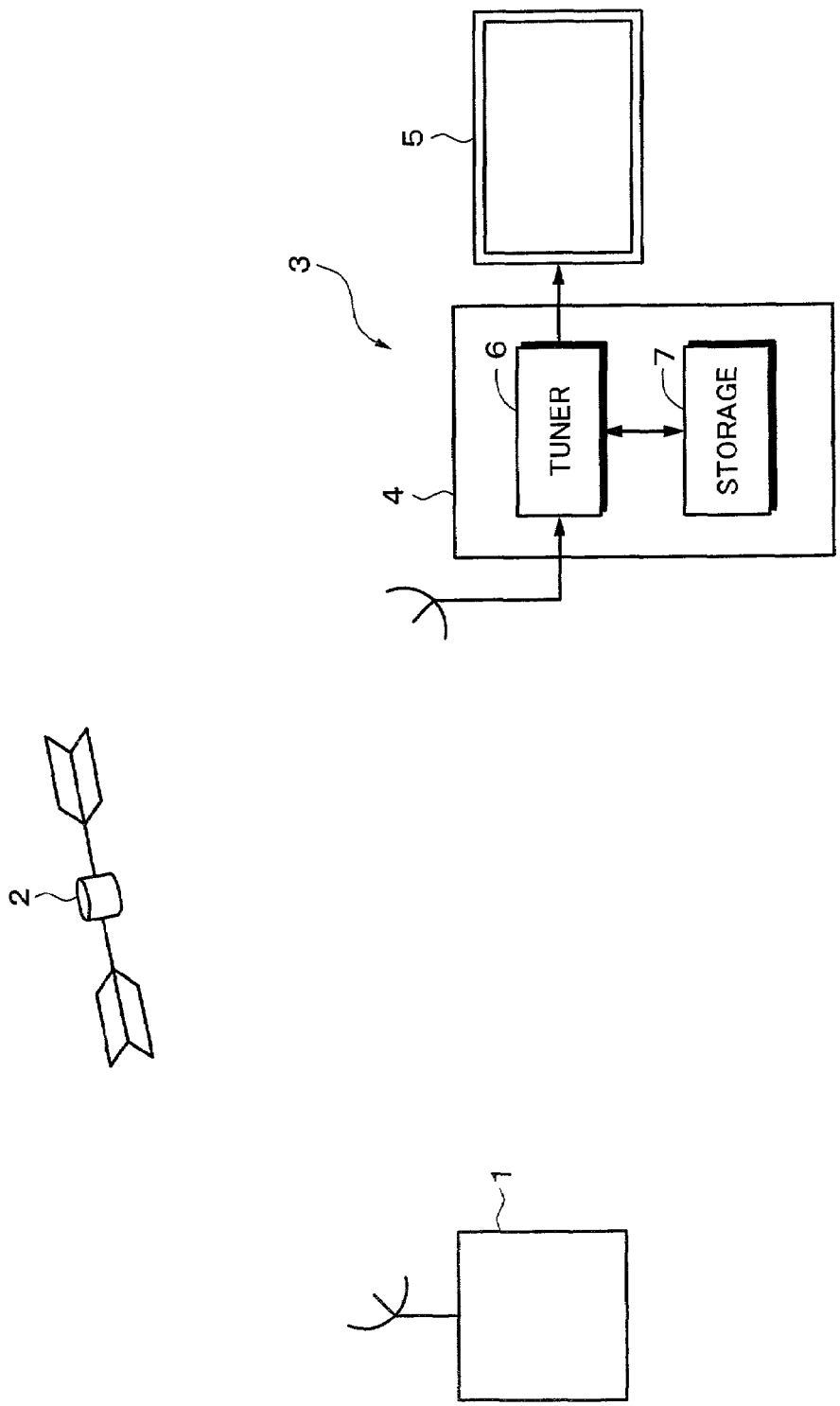
FIG. 1 is a block diagram showing an example of an information delivery system to which the present invention is applied.

A preferred embodiment of the present invention will be described below with reference to the drawings. The present invention can be applied to a system for delivering data on contents by utilizing a digital BS broadcast. FIG. 1 shows the whole structure of such a system for delivering the data on the contents by utilizing the digital BS broadcast.

In FIG. 1, the reference numeral 1 denotes a broadcasting station for a digital BS (Broadcast Satellite) broadcast, the reference numeral 2 denotes an artificial satellite which is carrying out the digital BS broadcast, and the reference numeral 3 denotes a receiving terminal for a user.

In the digital BS broadcast, for example, video data and audio data are transmitted in an MPEG2 (Moving Picture Coding Experts Group)-TS (Transport Stream) by using a band of 12 GHz (a frequency of 11.7 GHz to 12 GHz), for example. The video data are compressed based on an MPEG2 method and the audio data are compressed based on an MPEG2-ACC (Advanced Audio Coding) method. A video packet and an audio packet are incorporated in a transport stream of the MPEG2, and is hierarchically modulated with trellis 8PSK (Phase Shift Keying), QPSK (Quadrature Phase Shift Keying) or BPSK (Binary Phase Shift Keying) and is transmitted through a desired carrier, for example.

The broadcasting station 1 incorporates video data and audio data to be a source of a program to be broadcast in the transport stream of the MPEG2 as described above, modulates them through a desired carrier and transmits the modulated data toward the artificial satellite 2. A stream transmitted from the broadcasting station 1 has programs for a plurality of channels multiplexed. As described later, moreover, when an ordinary program is completed at night, the stream transmitted from the broadcasting station 1 includes data on contents to be delivered.

The artificial satellite 2 is an artificial satellite for a digital BS (BS-4 succeeding artificial satellite), for example, and has eight transponders mounted thereon, for example. One transponder has a transmission bandwidth of 30 Mbps, for example. One transponder can transmit six channels in an SDTV (Standard Definition Television) broadcast and two channels in an HDTV (High Definition Television) broadcast, for example.

A signal sent from the broadcasting station 1 is received by a receiving terminal 3 of each home through the artificial satellite 2. The receiving terminal 3 of each home comprises a receiver 4 and a television receiver 5. The receiver 4 receives a signal sent from the broadcasting station 1 through the artificial satellite 2, demodulates a transport stream of the MPEG2, extracts a video packet and an audio packet for a desired channel from the transport stream, and decodes a video signal and an audio signal.

The video signal and the audio signal thus decoded by the receiver 4 are supplied to the television receiver 5 and a reproduced screen is projected onto the television receiver 5.

Moreover, the receiver 4 is provided with a storage section 7. The storage section 7 is provided to store data on contents which are transmitted by effectively utilizing an empty band at night.

Figure 2:
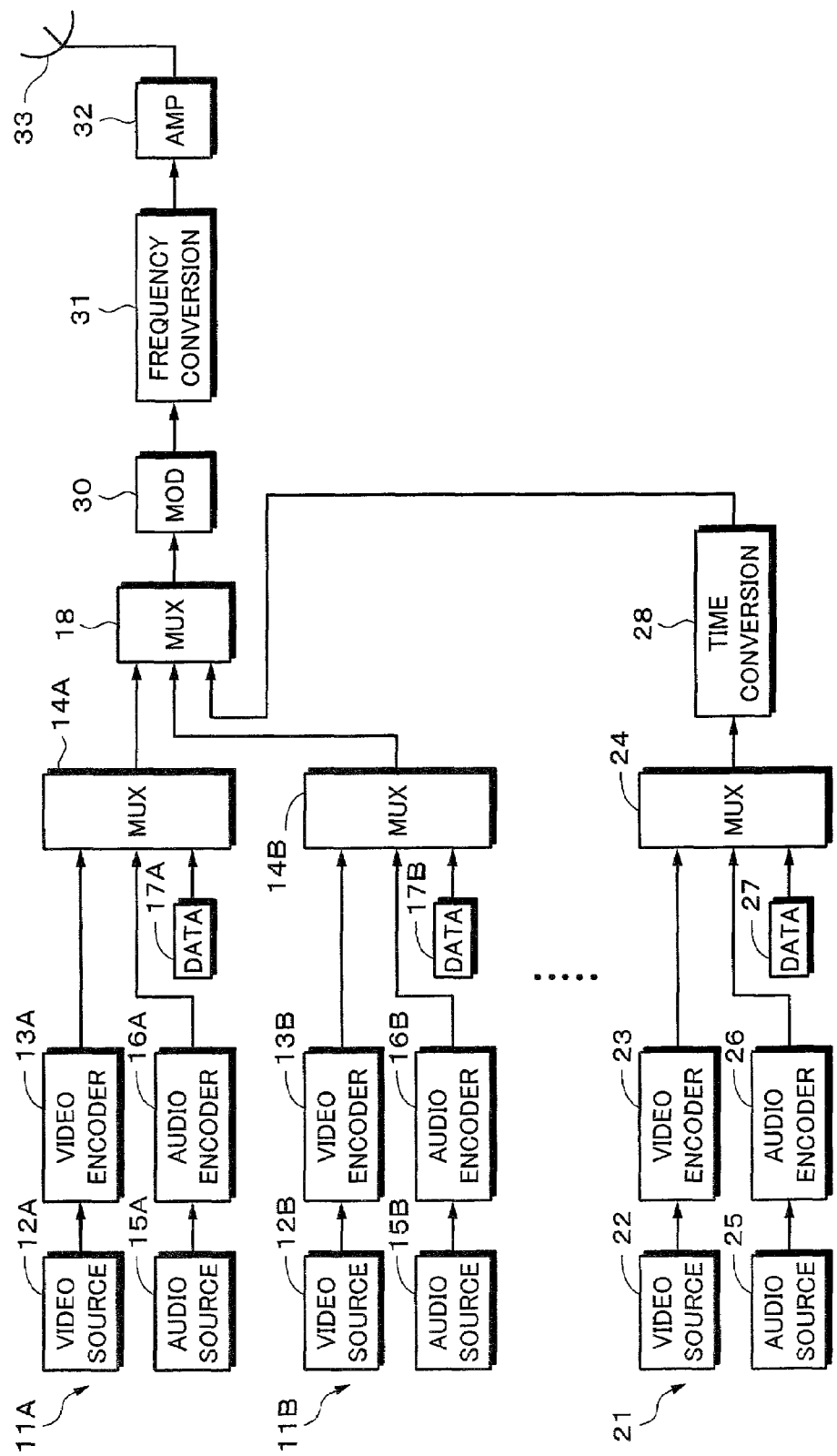
FIG. 2 is a block diagram showing an example of the transmitting side in the information delivery system to which the present invention is applied.

FIG. 2 shows the structure of the broadcasting station 1. In FIG. 2, the reference numerals 11A, 11B . . . denote broadcast signal processing sections for carrying out an ordinary broadcast, and the reference numeral 21 denotes a broadcast signal processing section for carrying out a contents delivery broadcast.

In the broadcast signal processing sections 11A, 11B . . . for an ordinary broadcast, video signals are sent from video sources 12A, 12B . . . to video encoders 13A, 13B . . . and audio signals are sent from audio sources 15A, 15B . . . to audio encoders 16A, 16B . . . . In the video encoders 13A, 13B . . . , video data are compressed by the MPEG2 method so that a video packet is formed. In the audio encoders 16A, 16B . . . , moreover, audio data are compressed by the MPEG2-AAC (Advanced Audio Coding) method so that an audio packet is formed. Furthermore, PSI (Program Specific Information) such as station selection information, restricted receipt information or program information is generated from data generating sections 17A, 17B . . . .

The outputs of the video encoders 13A, 13B . . . , the outputs of the audio encoders 16A, 16B . . . and the outputs of the data generating sections 17A, 17B . . . are supplied to multiplexers 14A, 14B . . . . In the multiplexers 14A, 14B . . . , a video packet, an audio packet and a data packet are multiplexed and are incorporated in a TS packet having a fixed length of 188 bytes. The outputs of the multiplexers 14A, 14B . . . are supplied to a multiplexer 18.

In a signal processing section 21 for a contents delivery broadcast, a video signal is sent from a video source 22 to a video encoder 23 and an audio signal is sent from an audio source 25 to an audio encoder 26. In the video encoder 23, video data are compressed by the MPEG2 method so that a video packet is formed. In the audio encoder 26, moreover, the audio data are compressed by the MPEG2-AAC method so that an audio packet is formed. Furthermore, PSI such as station selection information, restricted receipt information or program information is generated from a data generating section 27.

The output of the video encoder 23, the output of the audio encoder 26 and the output of the data generating section 27 are supplied to a multiplexer 24. In the multiplexer 24, a video packet, audio data and a data packet are multiplexed and are incorporated in a TS packet having a fixed length of 188 bytes.

The output of the multiplexer 24 is supplied to a time converting section 28. The time converting section 28 converts the transfer speed of data such that the data on the contents can be transferred at a higher speed than the real time when a time required for transferring the contents to be delivered cannot be maintained sufficiently or the data on the contents can be transferred at a lower speed than the real time when the empty band of the transponder cannot be maintained sufficiently for the transmission band of the data on the contents to be delivered.

The time converting section 28 can be implemented by an edit machine utilizing a personal computer, for example. IN the case in which the data on the contents are to be delivered at a higher speed than the real time, the TS packet is once stored in a hard disk drive of the personal computer constituting the time converting section 28 and is then output at a higher speed than an input rate. In the case in which the contents are to be delivered at a lower speed than the real time, the TS packet is once stored in the hard disk drive of the personal computer constituting the time converting section 28 and is then output at a lower speed than the input rate.

At this time, a value of a PCR (Program Clock Reference) is rewritten into a dummy PCR and time ratio information is added thereto. The dummy PCR and the time ratio information will be described later. As a matter of course, it is preferable that the time converting section 28 should convert a time required for transferring a TS packet stream and add the dummy PCR. Therefore, the time converting section 28 can also be implemented by special hardware.

The output of the time converting section 28 is supplied to the multiplexer 18. In the multiplexer 18, a TS packet of an ordinary broadcast for each channel which is formed in the broadcast signal processing sections 11A, 11B, . . . for each ordinary broadcast is multiplexed with a TS packet of the contents delivery broadcast formed in the signal processing section 21 for the contents delivery broadcast.

The output of the multiplexer 18 is supplied to a modulating section 30. The modulating section 30 carries out modulation through hierarchical coding in trellis 8PSK, QPSK or BPSK, for example.

The output of the modulating section 30 is supplied to a frequency converting section 31. The frequency converting section 31 converts a carrier frequency in response to a frequency of a transponder to be used. The output of the frequency converting section 31 is amplified by an amplifier 32, is output from an antenna 33 and is then transmitted toward the artificial satellite 2.

In a time zone in which an ordinary broadcast is carried out in all channels during the day, the broadcast signal processing sections 11A, 11B, . . . for an ordinary broadcast are operated and the band of the transponder of the artificial satellite 2 is occupied by a broadcast for these ordinary channels. Thus, when the band of the transponder of the artificial satellite 2 is occupied by the broadcast for the ordinary channels, an empty band for delivering contents data to the transponder is not maintained. Therefore, the operation of the signal processing section 21 for contents delivery is stopped.

In a time zone at night, programs for some ordinary broadcasts are completed and an empty band is generated in the transmission band of the transponder of the artificial satellite 2. At this time, some of the broadcast signal processing sections 11A, 11B, . . . for the ordinary broadcast in which the broadcast is completed are stopped to be operated. Consequently, the signal processing section 21 for delivering the data on the contents is operated to carry out a contents delivery broadcast.

Thus, the data on the contents are not delivered in a time zone in which the ordinary broadcast is carried out but in a time zone in which the ordinary broadcast is completed and an empty band is generated in the transmission band of the transponder of the artificial satellite 2. Consequently, the delivery cost of the contents can be reduced.

In this case, however, the delivery of the data on the contents is restricted to the time zone in which the empty band is generated in the transponder of the artificial satellite 2. Therefore, a time in which the data on the contents can be delivered is restricted by a time for broadcasting a program for an ordinary channel. For this reason, the data on the contents for a long time cannot be transmitted. Moreover, a band which can be maintained for transmitting the data on the contents is restricted to the empty band of the transponder which is generated while the ordinary broadcast is completed. Therefore, the data on the contents in a wide band cannot be transferred.

In this example, the time converting section 28 is provided in the latter stage of the multiplexer 24. In the case in which the data on the contents are to be delivered by utilizing the empty band of the transponder which is generated by the completion of the ordinary broadcast at night, the transfer speed of the data can be changed through the time converting section 28. In the case in which a time required for delivering the contents is long and a sufficient time required for transfer cannot be maintained, for example, the data on the contents are transferred at a higher speed than the real speed through the time converting section 28. Consequently, the data on the contents for a long time can be transferred. Moreover, in the case in which the transmission band of the data on the contents to be delivered cannot be maintained sufficiently, the data are transferred at a lower speed than the real time. Consequently, the data on the contents in a wide band can be transferred.

However, when the data on the contents are thus transferred in a different time from the real time, time information to be a reference cannot be obtained during reproduction so that a time base based on the real time cannot be restored.

In the embodiment of the present invention, therefore, in the case in which the data on the contents are to be transferred at a different speed from the real time, a dummy packet including time ratio information for reproducing the real time and the dummy PCR is transmitted.

Figure 3:
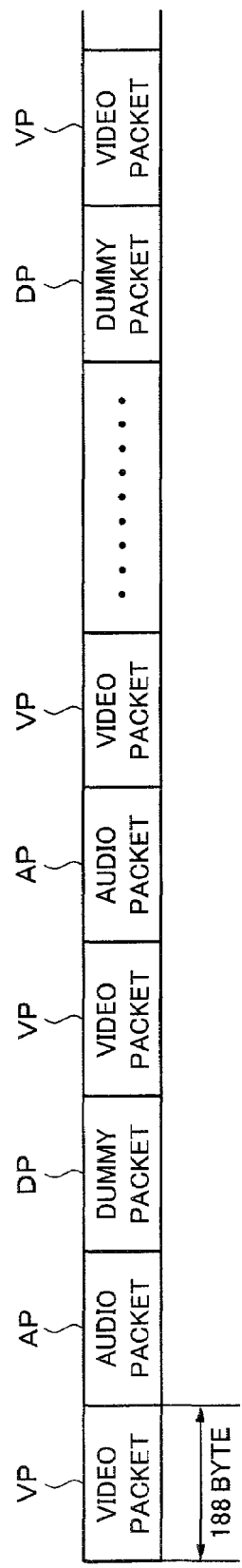
FIG. 3 is a schematic diagram to be used for explaining a packet stream to be transmitted.

FIG. 3 shows a stream to be transmitted from the broadcasting station 1 when the data on the contents are transferred at a different speed from the real time. The stream to be transmitted from the broadcasting station 1 is set to be a TS packet having a fixed length of 188 bytes and is incorporated in a transport stream of the MPEG2. The TS packet includes video packets VP, VP, . . . and audio packets AP, AP, . . . , and furthermore, dummy packets DP, DP, . . . as shown in FIG. 3. The dummy packets DP, DP, . . . include the time ratio information for restoring the real time and the dummy PCR. To the dummy packet is attached a PID (packet identifier) indicating that the TS packet is the dummy packet.

Figure 4:
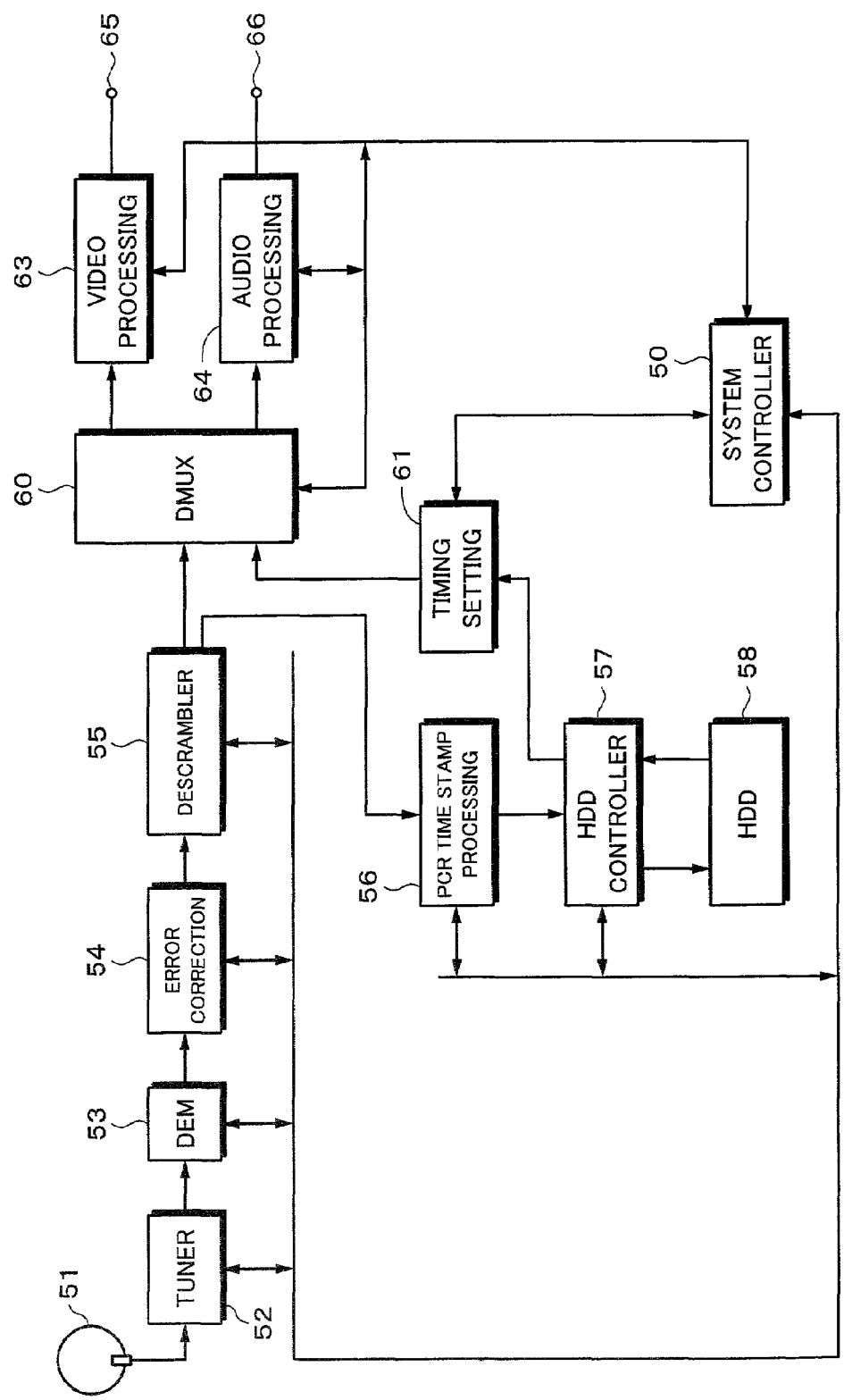
FIG. 4 is a block diagram showing an example of the receiving side in the information delivery system to which the present invention is applied.

FIG. 4 shows an example of the receiver 4 (FIG. 1) to which the present invention is applied. In FIG. 4, a signal sent from the broadcasting station 1 through the artificial satellite 2 is received by a parabolic antenna 51. The received signal is converted into an intermediate frequency signal having a 1 GHz band, for example, through an LNB (Low Noise Block Down Converter) attached to the parabolic antenna 51 which is not shown. An output of the LNB of the parabolic antenna 51 is supplied to a tuner section 52.

In the tuner section 52, a signal of a transponder having a desired carrier frequency is selected from the received signals. A received frequency of the tuner section 52 is set by an output of a system controller 50. An output of the tuner section 52 is supplied to a demodulating section 53.

The demodulating section 53 carries out a demodulation processing of the trellis 8PSK, the QPSK or the BPSK. More specifically, in the BS digital satellite broadcast, the hierarchical transmission is carried out through the BPSK, the QPSK and the trellis 8PSK. In the TC-8PSK modulation, the amount of information per symbol is increased. However, if attenuation is caused by rain, an error rate is deteriorated. On the other hand, in the BPSK or the QPSK, the amount of information per symbol is reduced. However, even if the attenuation is caused by the rain, the error rate is not very reduced.

On the transmitting side, each TS packet is mapped into a frame constituted by 48 slots by causing one TS packet to correspond to one slot. For each slot, a modulating method and a coding method can be allocated. The type of the modulating method allocated to each slot and a coding rate are transmitted through a TMCC (Transmission and Multiplexing Configuration Control) signal. A superframe is constituted in a unit of eight frames and interleave is carried out for each position of the slot.

In the demodulating section 53, if the CN ratio of the received signal is good, the demodulation is carried out through the trellis 8PSK. When the attenuation is caused by the rain so that the CN ratio of the received signal is deteriorated, the demodulation is carried out through the BPSK or the QPSK.

The output of the demodulating section 53 is supplied to an error correcting section 54. The error correcting section 54 carries out an error correction processing through a Reed-Solomon code, for example.

The output of the error correcting section 54 is supplied to a descrambler 55. The descrambler 55 carries out CAS (Condition Access System) control. In the case of restricted receipt, a descramble processing is carried out. A transport stream is obtained from the output of the descrambler 55.

The transport stream output from the descrambler 55 is supplied to a demultiplexer 60 and to a PCR-time stamp processing section 56. In the case in which an ordinary broadcast is to be received, the stream supplied from the descrambler 55 is transmitted to the demultiplexer 60. In the case in which the ordinary broadcast is to be recorded or the data on the contents are to be stored, the output of the descrambler 55 is supplied to the PCR-time stamp processing section 56.

The demultiplexer 60 serves to separate a desired packet from the stream transmitted from the descrambler 55 based on an instruction given from the system controller 50.

More specifically, a PID is described in a header section of the TS packet thus transmitted. Based on the PID, the demultiplexer 60 separates a video packet, an audio packet and a data packet for a desired program. The video packet is transmitted to the video processing section 63 and the audio packet is transmitted to the audio processing section 64. The data packet is transmitted to the system controller 50.

A video processing section 63 carries out a decoding processing of the MPEG 2 method so that a video signal is decoded. The video signal is output from an output terminal 65. Moreover, an audio processing section 64 carries out a decoding processing of the MPEG2-AAC method so that an audio signal is decoded. The audio signal is output from an output terminal 66.

A stream transmitted for delivering the data on the contents is supplied from the descrambler 55 to the PCR time stamp processing section 56. The transfer speed of the data on the contents can be made different from the real time as described above. In the case in which the data on the contents are to be transmitted at a different speed from the real time, the dummy packet including the time ratio information for reproducing the real time and the dummy PCR is sent.

The PCR time stamp processing section 56 acquires the dummy packet, and the time ratio information and the value of the dummy PCR in the dummy packet are extracted. Then, the PCR time stamp processing section 56 carries out an operation by using the time ratio information and the value of the dummy PCR included in the dummy packet and the time of an internal input timer. Consequently, time information based on the real time can be obtained. The time information based on the real time is added as a time stamp to the TS packet. In the case in which the arriving packet is a dummy packet, an adaptation field is rewritten.

In the case in which an ordinary broadcast is to be recorded, it is not necessary to obtain the time information again or to rewrite the description of the adaptation field because the ordinary broadcast is carried out in the real time. Also in a stream transmitted to deliver the data on the contents, moreover, it is not necessary to obtain the time information again or to rewrite the description of the adaptation field if the stream is transmitted in the real time. In this case, the PCR time stamp processing section 56 adds, to the TS packet, a time stamp formed by the internal input timer.

The output of the PCR time stamp processing section 56 is supplied to the hard disk drive 58 through the hard disk controller 57 and is stored in the disk of the hard disk drive 58.

The data stored in the hard disk drive 58 are read through the hard disk controller 57 and are supplied to a timing setting section 61. The timing setting section 61 fetches the time stamp added during the recording from the output of the hard disk drive 58, and the output timing of the packet is set based on the time information indicated by the time stamp and the time information of an internal output timer. Based on the timing, the data read from the hard disk drive 58 are supplied to the demultiplexer 60.

Figure 5:
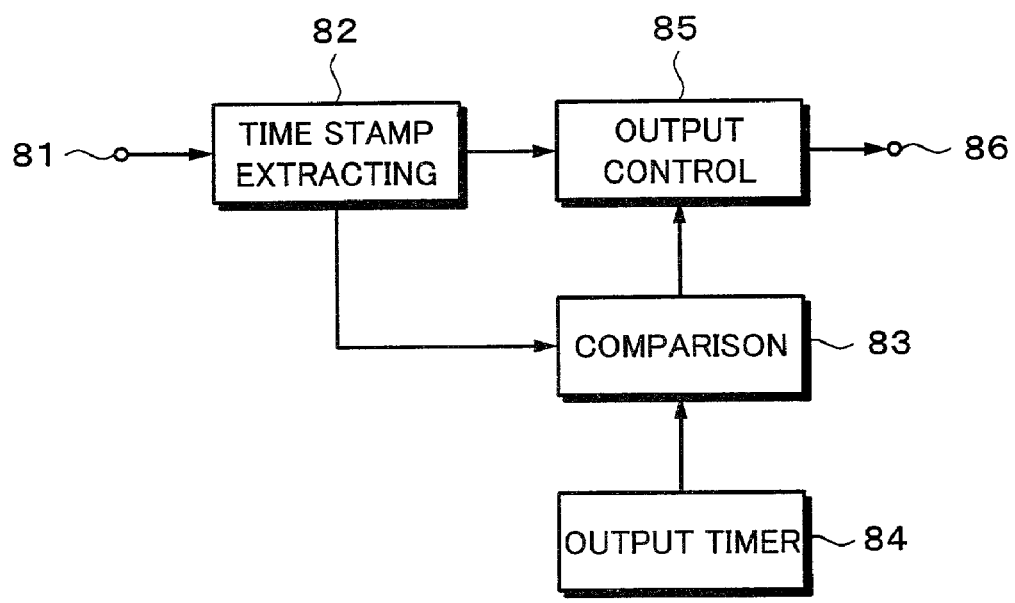
FIG. 5 is a block diagram showing an example of a timing setting section.

More specifically, FIG. 5 shows an example of the timing setting section 61 in FIG. 4. In FIG. 5, the reproduced TS packet is supplied from the hard disk drive 58 to an input terminal 81 through the hard disk controller 57. A time stamp is added to the TS packet as described above.

In the case of the data on the contents which are transmitted through the ordinary broadcast or in the real time, the time stamp indicates a time of the input timer which is obtained when the packet arrives. In the case of the data on the contents which are transmitted at a higher or lower speed than the real time, the time stamp indicates a time based on the real time which is obtained through a calculation using the time ratio information or the value of the dummy PCR and the time of the internal input timer.

A time stamp extracting section 82 extracts a time stamp added to the TS packet. Then, the TS packet is supplied to an output control section 85 and the time stamp is supplied to a comparing section 83. The time information is supplied from an output timer 84 to the comparing section 83. The comparing section 83 compares the time stamp thus extracted with the time information transmitted from the output timer.

If the time stamp extracted by the time stamp extracting section 82 is coincident with an output timer value sent from the output timer 84, a control signal is output from the comparing section 83. In response to the control signal, the output of an output control section 85 is controlled and a TS packet thereof is output from an output terminal 86.

In the case of the data on the contents which are transmitted through the ordinary broadcast or in the real time, the time of the input timer which is obtained when the packet arrives is added as a time stamp. Accordingly, the information read from the hard disk drive 58 is read based on the timing of the output timer 84 in the same manner as that obtained when the time stamp is added. Consequently, the packet stream can be restored on the same time base as that during input.

In the case of the data on the contents which are transmitted at a higher or lower speed than the real time, a time based on the real time which is obtained through a calculation using the time ratio information or the value of the dummy PCR and the time of the internal input timer is added as a time stamp. The calculation will be described later. Accordingly, when the information read from the hard disk drive 58 is read based on the timing of the output timer 84, the packet stream can be restored in a time base on the basis of the real time.

In FIG. 4, the output of the timing setting section 61 is supplied to the demultiplexer 60. The demultiplexer 60 separates a video packet from an audio packet. The video packet is supplied to the video processing section 63. The audio packet is supplied to the audio processing section 64.

The video processing section 63 carries out the decoding processing of the MPEG 2 method so that a video signal is decoded. The video signal is output from the output terminal 65. Moreover, the audio processing section 64 carries out the decoding processing of the MPEG2-AAC method so that an audio signal is decoded. The audio signal is output from the output terminal 66.

Figure 6:
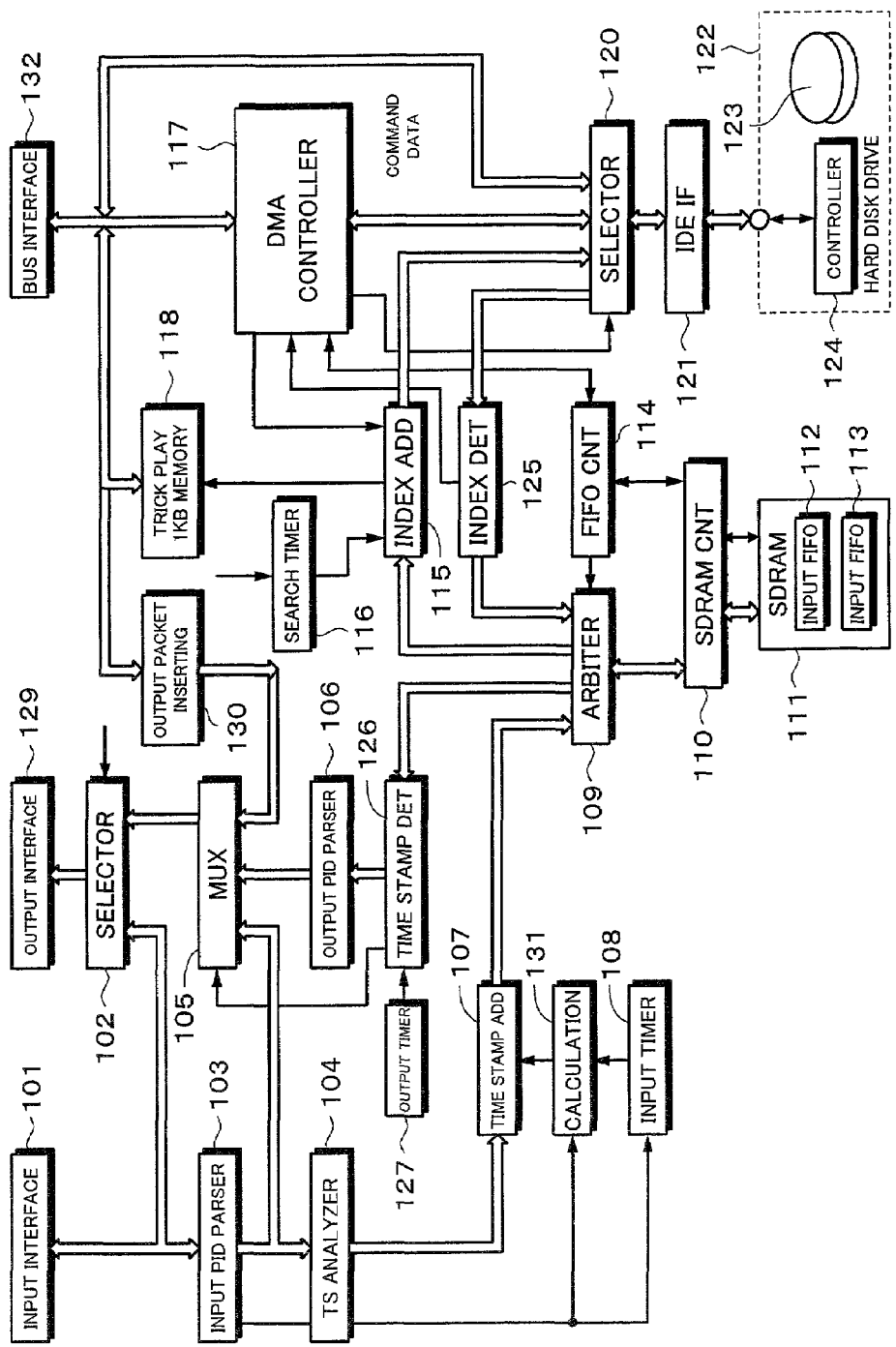
FIG. 6 is a block diagram showing the details of the receiving side in the information delivery system to which the present invention is applied.

FIG. 6 is a block diagram illustrating a more specific structure of the receiver 4. In FIG. 6, a transport stream sent from the descrambler 55 (FIG. 4) is input from an input interface 101 and is supplied to a selector 102 and an input PID parser 103. The output of the selector 102 is supplied to an output interface 129.

The output interface 129 is connected to the demultiplexer 60 (FIG. 4). In the case in which an ordinary program is watched and the recording is not carried out, a stream sent from the input interface 101 is output from the output interface 129 through the selector 102 and is sent to the demultiplexer 60.

In the case in which an ordinary program is to be recorded on the hard disk drive or the data on the contents which are delivered are to be stored in the hard disk drive, the stream input from the input interface 101 is supplied to the input PID parser 103.

The input PID parser 103 extracts a TS packet necessary for recording or control from the TS packets constituting the received transport stream. Unnecessary TS packets are discarded by the input PID parser 103. The packet for recording is supplied to a TS packet analyzer 104. The packet is analyzed by the TS packet analyzer 104.

A multiplexer 105 multiplexes a TS packet output from the input PID parser 103, a TS packet reproduced from the hard disk which is output from an output PID parser 106 and a TS packet sent from a packet inserting section 130, and outputs them to the selector 102.

The output of the TS packet analyzer 104 is supplied to a time stamp adding section 107. The time information is supplied from a time calculating section 131 to the time stamp adding section 107. The output of the input timer 108 is supplied to the time calculating section 131.

If the input stream is a real time, the time stamp adding section 107 adds a time stamp to the input TS packet based on a time sent from the input timer 108.

If the input stream is different from the real time, a dummy packet including time ratio information for reproducing the real time and a dummy PCR is transmitted. The TS packet analyzer 104 acquires the dummy packet and the time ratio information and the value of the dummy PCR in the dummy packet are extracted. The time ratio information and the dummy PCR are sent to the time calculating section 131.

The time calculating section 131 carries out an operation using the time ratio information and the dummy PCR included in the dummy packet and the time of the input timer 108 at which the packet arrives so that time information based on the real time can be obtained. The real time information is added as a time stamp to the TS packet. In the case in which the arriving packet is a dummy packet, an adaptation field is rewritten such that the dummy packet has a value of an ordinary PCR.

The time stamp adding section 107 and the time calculating section 131 correspond to the PCR time stamp processing section 56 shown in FIG. 4.

The TS packet having the time stamp added thereto by the time stamp adding section 107 is supplied to an arbiter 109. The arbiter 109 arranges a request generated on an SDRAM (Synchronous Dynamic Random Access Memory) 111. The TS packet input to the arbiter 109 is stored in an input FIFO (First-In First-Out) 112 of the SDRAM 111 through an SDRAM controller 110.

The TS packet stored in the input FIFO 112 is read from the SDRAM controller 110 and is supplied to an index adding section 115 through the arbiter 109.

A time stamp for search is transmitted from a search timer 116 to the index adding section 115 and the output of a DMA (Direct Memory Access) controller 117 is supplied thereto.

The data to be recorded on the hard disk drive are processed for each cluster to be a recording unit of the hard disk through DMA transfer. The index adding section 115 adds, to each cluster, an index including a stamp for search, an LBA (Logical Block Address) and a user region, and the data which have the index added thereto and are clustered are supplied to a selector 120.

On the other hand, a bus interface 132 is connected to the system controller 50 (FIG. 4) and a command and data are transmitted from the system controller 50 through the bus interface 132. The command and data are transmitted to the selector 120. Moreover, the command and data are supplied from the DMA controller 117 to the selector 120 such that the DMA transfer can be carried out.

The data transmitted from the index adding section 115 are supplied to a hard disk drive 122 through the selector 120 and the interface 121. The same data are recorded on a disk 123 of the hard disk drive 122 through a hard disk controller 124. Thus, the data based on the stream of the received TS packet are recorded on the disk 123 of the hard disk drive 122.

In the case in which the data based on the TS packet which are stored in the disk 123 of the hard disk drive 122 are to be reproduced, the data are read from the disk 123. The data are read for each cluster and the data thus read are supplied to an index detecting section 125 through the interface 121 and the selector 120.

The index detecting section 125 serves to detect the index added in the index adding section 115 from the reproduced data. The index thus detected is stored in a register in the DMA controller 117, and the DMA controller 117 serves to control the operation for reading data from the disk based on the stored index. Then, the index is removed.

A reproduction transport stream transmitted from the index detecting section 125 is once stored in the output FIFO 113 of the SDRAM 111 through the arbiter 109 and the SDRAM controller 110.

The reproduction transport stream stored in the output FIFO 113 is read through the SDRAM controller 110 and is supplied to the arbiter 109, and furthermore, to a time stamp detecting section 126.

The output of an output timer 127 is supplied to the time stamp detecting section 126. The time stamp detecting section 126 detects the time stamp added in the time stamp adding section 107 during input. Then, the reproduction transport stream is output in such a timing as to return a time interval between the TS packets to an original state in accordance with the time stamp based on the time of the output timer 127.

The control of the time stamp detecting section 126 corresponds to the timing setting section 61 shown in FIG. 4.

The reproduction transport stream is supplied to the output PID parser 106. The output PID parser 106 receives the reproduction transport stream output from the time stamp detecting section 126, extracts a reproduction packet to be reproduced from the TS packet constituting the reproduction transport stream, and outputs the reproduction packet to the multiplexer 105.

The multiplexer 105 multiplexes a TS packet output from the output PID parser 103, a TS packet output from the input PID parser 106 and a TS packet transmitted from an output packet inserting section 130, and outputs them to the output interface through the selector 102.

The output interface 129 is connected to the demultiplexer 60 (FIG. 4) and the reproduced TS packet stream is transmitted from the output interface to the demultiplexer 60.

In this example, thus, in the case in which the data on the contents are to be delivered, the same data are transmitted at a different speed from a real time. In this case, a dummy packet DP including a dummy PCR and time ratio information is transmitted as shown in FIG. 3. On the receiving side, the PCR time stamp processing section 56 shown in FIG. 4 uses the dummy PCR and the time ratio information and the time of the input timer at which the packet arrives for the data transferred at a different speed from the real time to calculate time information based on the real time through an operation and to add the time information thus obtained as a time stamp to the TS packet. Moreover, the adaptation field of the dummy packet is rewritten such that the dummy packet has a value of an ordinary PCR. Consequently, the data transmitted at a different speed from the real time can be reproduced through the same processing as a processing for the stream sent in the real time during the reproduction, which will be described below in detail.

In the TS packet of the MPEG2, a reference value to be a base of a program time which is referred to as a PCR is sent at regular intervals (for example, 100 msecs.). In an ordinary system, the value of the PCR is used as a basic reference value of the program time.

FIG. 7 shows an MPEG transport stream. As shown in FIG. 7A, the transport stream of the MPEG2 includes a 188-byte TS packet. As shown in FIG. 7B, the TS packet has a synchronization byte (8 bits) indicative of the head of a packet, an error indicator (1 bit) indicative of the presence of an error in the packet, a unit start indicator (1 bit) indicating that a new PES packet is started at a payload of the transport packet, a transport packet priority (1 bit) indicative of the degree of importance of the packet, a PID (13 bits) for identifying individual packets, a scramble control (2 bits) indicative of the presence of scramble of a payload, an adaptation field control (2 bits) indicative of the presence of an adaptation field and the presence of a payload, acyclic counter (4 bits) for detecting, based on the continuity of a receiving count, that a packet having the PID is partially discarded in the middle or not, an adaptation field for transmitting additional information about the individual streams, and a payload (information).

Figure 7A:
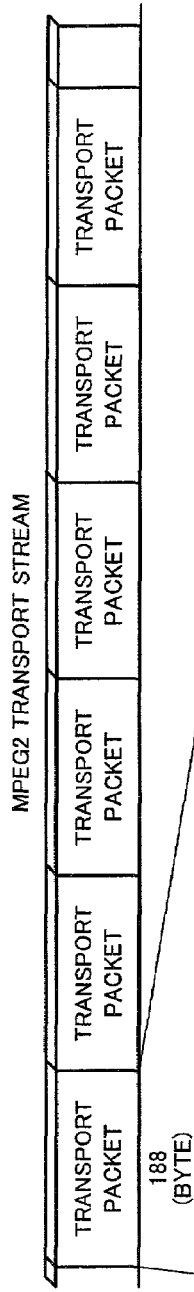
FIG. 7 is a schematic diagram to be used for explaining an MPEG2 transport stream.
Figure 7B:
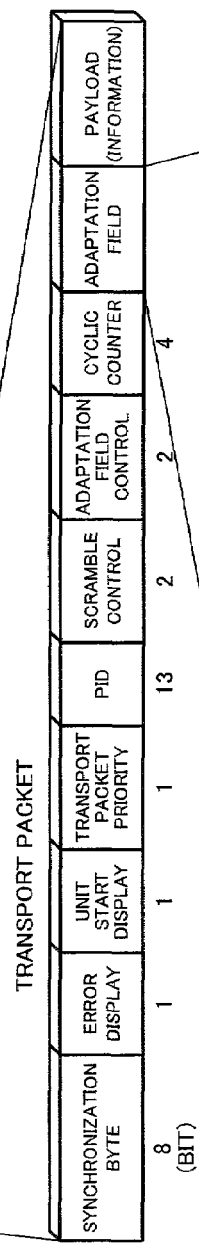
Figure 7C:
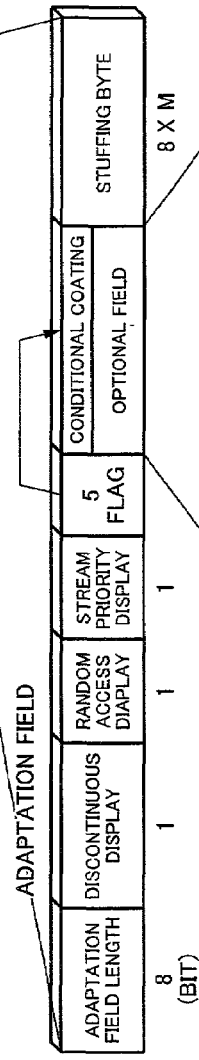

The adaptation field can include the additional information about the individual streams and stuffing. As shown in FIG. 7C, the adaptation field includes an adaptation field length (8 bits), a discontinuous indicator (1 bit), a random access indicator (1 bit), a stream priority indicator (1 bit), five flags for an optional field, the optional field, and a stuffing byte.

The adaptation field length represents the length of the adaptation field. The discontinuous indicator indicates that a system clock of the same PID is then reset to have new contents. The random access indicator indicates the start of a video sequence or the start of an audio sequence, and represents an entry point of a random access. The stream priority indicates that the important portion of the individual stream is the payload of the packet. In the case of a video, for example, the stream priority represents an intra coding portion.

Figure 7D:
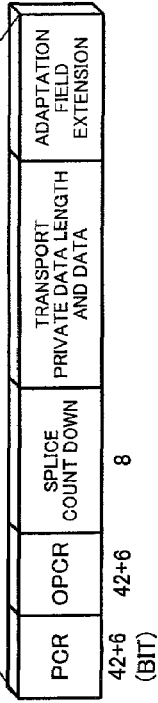

As shown in FIG. 7D, the optional field includes a PCR (Program Clock Reference) (42+6 bits), an OPCR (Original PCR) (42+6 bits), a splice count down (8 bits), a transport private data length and data, and an adaptation field extension. A flag provided before the optional field indicates the state of each of the five optional fields. The stuffing byte is a stuffing for causing the TS packet to have a fixed length of 188 bytes.

FIG. 8 shows the description of the adaptation field of the TS packet having the value of the PCR.

As shown in FIG. 7C, the adaptation field can include the additional information about the individual stream and the stuffing. The adaptation field includes an adaptation field length (adaptation_field_length), a discontinuity indicator (discontinuity_indicator), a random access indicator (random_access_indicator), a stream priority indicator (elementary_stream_priority_indicator), five flags for an optional field (PCR_flag, OPCR_flag, splicing_point_flag, transport_private_data_flag, adaptation_field_extension_flag), the optional field, and a stuffing byte.

In the case of the packet having the value of the PCR, the value of the PCR is described. For this reason, the PCR flag (PCR_flag) in the five flags (PCR_flag, OPCR_flag, splicing_point_flag, transport_private_data_flag, adaptation_field_extension_flag) is set to "1".

The PCR has a 33-bit program clock reference base (program_clock_reference_base), a 6-bit reserve (reserved), and a 9-bit program clock reference extension (program_clock_reference_extension).

In this example, as described above, in the case in which the data on the contents are to be transferred at a different speed from the real time, the dummy packet is sent. The dummy packet includes the value of the dummy PCR and the time ratio information in the adaptation field.

FIG. 9 shows the description of the structure of the adaptation field of the dummy packet.

In the case of the dummy packet, transport private data (transport_private_data) of the adaptation field including the dummy PCR and the time ratio information are processed and a transport private data flag (transport_private_data_flag) indicating there are transport private data in the five flags (PCR_flag, OPCR_flag, splicing_point_flag, transport_private_data_flag, adaptation_field_extension_flag) is set to "1".

As the transport private data (transport_private_data), the dummy PCR (Dummy PCR) and the time ratio information (Dummy Ratio) are described.

The dummy PCR (Dummy PCR) has a 33-bit dummy program clock reference base (dummy_program_clock_reference_base), a 6-bit reserve (dummy_reserved), and a 9-bit dummy program clock reference extension (dummy_program_clock_reference_extension), and this format is the same as an ordinary PCR format.

The time ratio information (Dummy Ratio) indicates a ratio of the transfer speed of a real time to a time required for transferring data, and includes a 5-bit integer value (output_ratio_int), a 12-bit decimal value (output_ratio_decimal), and a 7-bit reserve (output_ratio_reserved).

Next, description will be given to an operation for calculating a time based on a real time from the time ratio information and the value of the dummy PCR and the time of the input timer at which the packet arrives.

The TS packet is transferred at a higher or lower speed by a time ratio represented by the time ratio information for the real time. Consequently, a time required from a time at which a dummy packet first arrives to a time at which a next packet arrives is shorter or longer than the real time by the time based on the time ratio information. Accordingly, if a difference between the time at which the input packet arrives and the time at which the dummy packet first arrives is multiplied by the time ratio information, an output time based on the real time can be obtained.

More specifically, an input arrival time of the first dummy packet is represented by idt(0), an input arrival time of an ordinary n-th packet from the first dummy packet is represented by irt(0)(n) and time ratio information in the dummy packet is represented by ratio, an output time ort(0)(n) of the n-th packet from the first dummy packet can be calculated in the following equation.

$$ort(0)(n)=(irt(0)(n)-idt(0))\text{ ratio} \quad (1)$$

Figure 10:
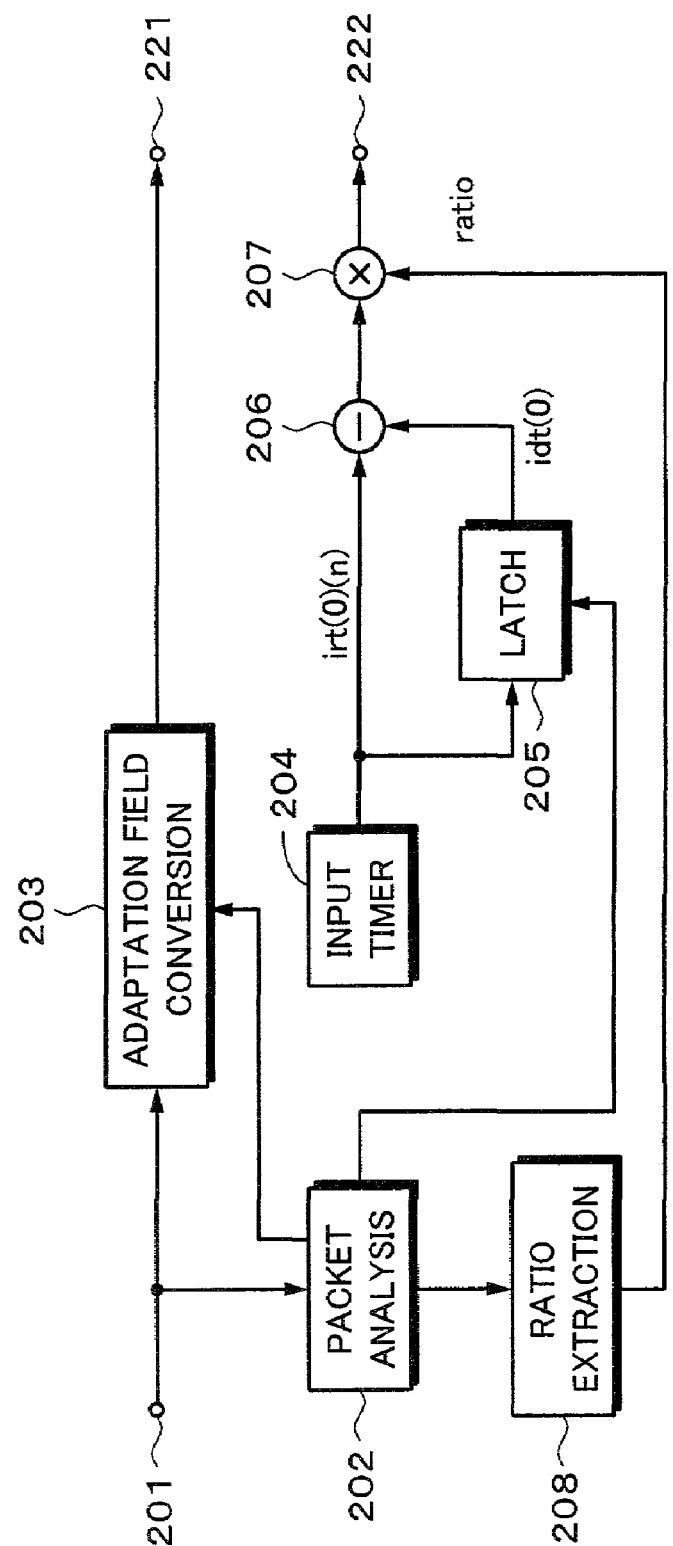
FIG. 10 is a block diagram showing an example of a time calculating section.

FIG. 10 shows the circuit structure of the PCR time stamp processing section 56 (FIG. 4) (or the time calculating section 131 (FIG. 6)) in the case in which the difference between the arrival time of the first dummy packet and the arrival time of the input packet is multiplied by the time ratio information to calculate the output time of the same packet.

In FIG. 10, a received TS packet is input from an input terminal 201 and is supplied to a packet analyzing section 202 and an adaptation field converting section 203. In the case in which the input TS packet is a dummy packet, the adaptation field converting section 203 rewrites an adaptation field.

In other words, the contents of the transport_private_data and the contents of the PCR are rewritten to obtain an ordinary packet having an ordinary PCR shown in FIG. 8 in the adaptation field of the dummy packet shown in FIG. 9. The PCR_flag is changed from "0" to "1" and the transport_private_data_flag is changed from "1" to "0". The output of the adaptation field converting section 203 is sent from a packet output terminal 221.

The packet analyzing section 202 decides whether the input TS packet is a dummy packet or other ordinary packets.

When the first dummy packet is input, the time idt(0) of the input timer 204 is fetched into the latch 205. The ratio extracting section 208 extracts the time ratio information ratio from the dummy packet and set the same to the multiplier 207.

In the case of dummy packets other than the first dummy packet, the time irt(0)(n) of the input timer 204 at which the TS packet arrives is supplied to the subtracter 206. The subtracter 206 calculates a difference between the arrival time idt(0) of the first dummy packet latched in the latch 205 and the arrival time irt(0)(n) of the input packet:

$$irt(0)(n)-idt(0).$$

The output of the subtracter 206 is supplied to the multiplier 207.

The time ratio information ratio extracted through the ratio extracting section 208 is supplied to the multiplier 207. The multiplier 207 multiplies the difference (irt(0)(n)−idt(0)) between the arrival time idt(0) of the first dummy packet and the arrival time irt(0)(n) of the input packet by the time ratio information ratio. Consequently, the operation expressed in the equation (1) is carried out. The output of the multiplier 207 is sent from an output terminal 222.

FIG. 11 shows an example of the case in which the difference between the arrival time of the first dummy packet and the arrival time of the input packet is multiplied by the time ratio information to calculate the output time of the packet and the output time is added as a time stamp to the packet. In this example, the data on the contents are transferred at a hither speed than the real time and the time ratio information is set to "2".

In FIG. 11, it is assumed that a dummy packet D_P0 is input at a time "0". At this time, the time "0" of the input timer 204 is fetched as an arrival time idt(0) of the first dummy packet into the latch 205. Since the first dummy packet D_P(0) is a base, an output time thereof is "0".

Next, when a packet P_R(0)(0) is input at a time "2", the value of "2" of the input timer 204 is fetched as an arrival time irt(0)(0) of the packet. At this time, the time "0" fetched into the latch 205 is subtracted from the value "2" of the input timer 204 and a value thus obtained is multiplied by time ratio information "2". Accordingly, the output time ort(0)(0) is obtained as follows.

$$ort(0)(0)=(2-0)\times2=4$$

Next, when a packet R_P(0)(1) is input at a time "4", a value "4" of the input timer 204 is fetched as an arrival time irt(0)(1) of the packet. At this time, the time "0" fetched into the latch 205 is subtracted from the value "4" of the input timer 204 and a value thus obtained is multiplied by time ratio information "2". Accordingly, the output time ort(0)(1) is obtained as follows.

$$ort(0)(1)=(4-0)\times2=8$$

In the same manner, output times ort(0)(2), ort(0)(3) . . . of packets R_P(0)(2), R_P(0)(3) . . . are obtained as "12", "16" . . . .

Thus, the calculation for multiplying the difference (irt(0)(n)−idt(0)) between the input arrival time of the input TS packet and the input arrival time of the first dummy packet by the time ratio information ratio to calculate the output time ort(0)(n) has an advantage in that a circuit structure can be simplified because the output time can be calculated through one subtracter 206 and one multiplier 207 as shown in FIG. 10. With such a structure, as shown in FIG. 11, the difference Δ1, Δ2, . . . between the arrival time of the input packet and the arrival time of the first dummy packet is multiplied by the time ratio information to calculate the output time. Therefore, there is a problem in that an error is accumulated. The error includes an error of a time stamp, an error based on a PCR on the delivery side, a jitter of a packet on the delivery side and the like. In the case in which these errors are made, they are smaller in the vicinity of the first dummy packet and are more accumulated more distantly from the first dummy packet so that a great error is made.

It can be proposed that the value of the dummy PCR is used to calibrate the output time such that the error is not accumulated.

In other words, it is assumed that the input TS packet is a dummy packet. As described above, the dummy packet includes the value of the dummy PCR. In the case in which the input TS packet is the dummy packet, a time during output is calculated based on the value of the dummy PCR. The value of the dummy PCR reflects a real time. Therefore, the error of the output time calculated by the dummy PCR is not accumulated.

More specifically, in the case in which a value of an x-th dummy PCR is represented by (D_pcr(x)), a value of a last dummy PCR is represented by (D_pcr(x−1)) and a difference thereof is represented by diff:

$$diff = D\_pcr(x) - D\_pcr(x-1),$$

the x-th dummy packet is output after the diff from the output time of the (x−1)th dummy packet. Accordingly, an output time odt(x) of the x-th dummy packet is calculated by a value obtained through an addition of the difference diff between the value (D_pcr(x)) of the x-th dummy PCR and the value (D_pcr(x−1)) of the last dummy PCR to a time odt(x−1) at which the last dummy packet is output.

$$odt(x) = odt(x-1) + diff$$
$$= odt(x-1) + D\_pcr(x) - D\_pcr(x-1)).$$

Thus, the output time of the dummy packet is calculated from the value of the dummy PCR. Since the time thus obtained from the value of the dummy PCR is based on the real time, an error is not accumulated. When the output time of the packet is calibrated based on the output time of the dummy packet thus obtained, the error is calibrated every time the dummy packet is input. Consequently, an error can be prevented from being accumulated.

On the basis of the x-th dummy packet, the output time ort(x)(n) of an n-th ordinary packet from the x-th dummy packet is obtained through an addition of a value obtained by multiplying the difference between the input arrival time irt(x)(n) of the packet and the input arrival time idt(x) of the x-th dummy packet by the time ratio information ratio for the output time odt(x) of the x-th dummy packet.

$$ort(x)(n) = odt(x) + (irt(x)(n) - idt(x)) \text{ ratio} \quad (3)$$

As expressed in the above-mentioned equation (2), the output time odt(x) of the x-th dummy packet is obtained from the difference between the dummy PCRs of the continuous dummy packets. If the output time odt(x) of the dummy packet which is calculated by the equation (2) is substituted for the equation (3), the following equation can be obtained.

$$ort(x)(n) = odt(x-1) + (D\_pcr(x) - D\_pcr(x-1) + (irt(x)(n) - idt(x)) \text{ ratio} \quad (4)$$

Figure 12:
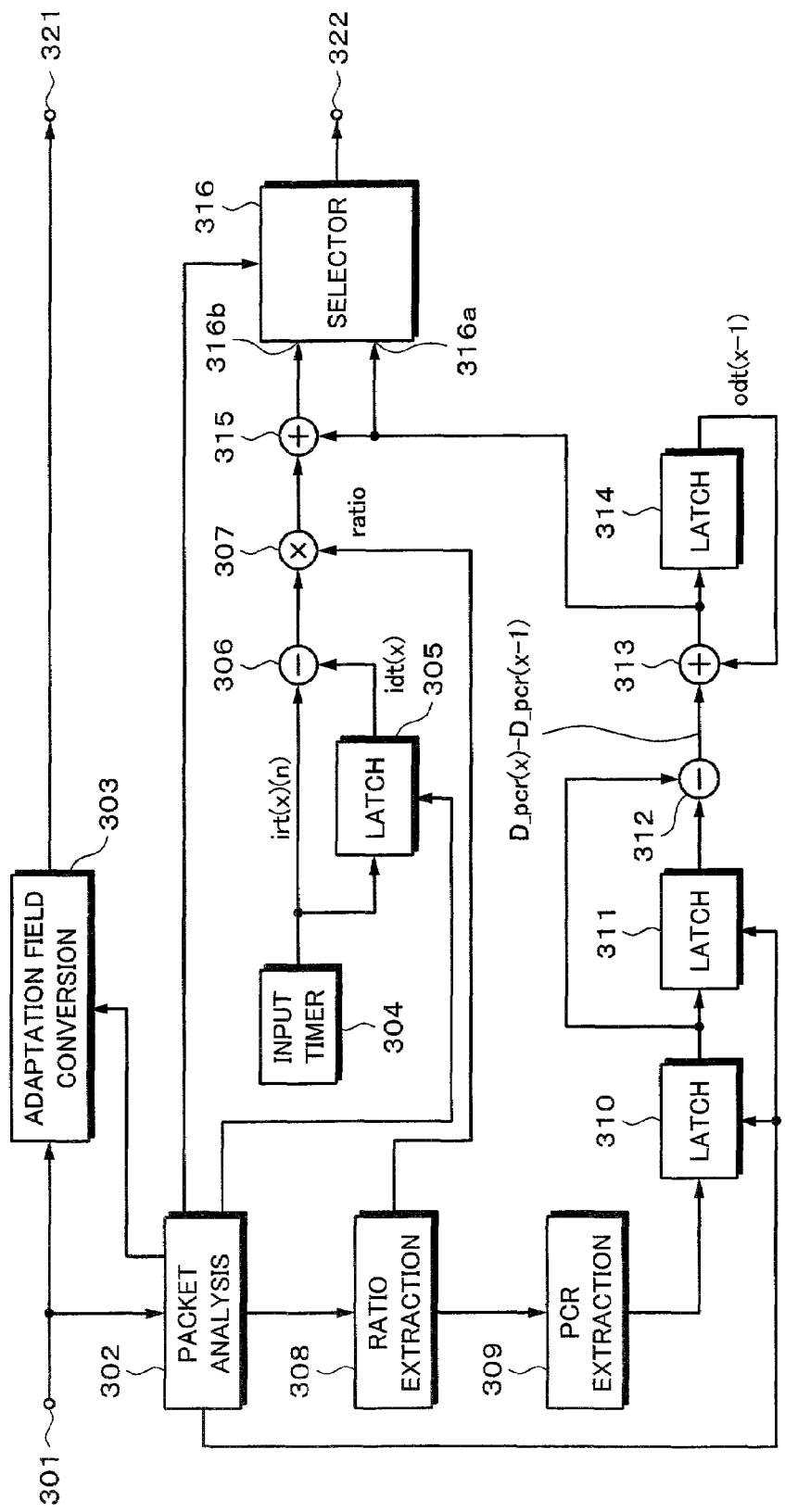
FIG. 12 is a block diagram showing another example of the time calculating section.

FIG. 12 shows an example of the PCR time stamp processing section 56 (or the time calculating section 131) for calculating an output time through the above-mentioned operation. In FIG. 12, the received TS packet is input from an input terminal 301 and is supplied to a packet analyzing section 302 and to an adaptation field converting section 303. In the case in which the input TS packet is a dummy packet, the adaptation field converting section 303 rewrites an adaptation field. The output of the adaptation field converting section 303 is sent from a packet output terminal 321.

The packet analyzing section 302 decides whether the input TS packet is a dummy packet or other ordinary packets. When the input packet is a dummy packet, the time of the input timer 304 is fetched as idt(x) into the latch 305. Then, the output of the packet analyzing section 302 is supplied to a ratio extracting section 308, and furthermore, to a PCR extracting section 309. The ratio extracting section 308 extracts the time ratio information ratio from the dummy packet and the PCR extracting section 309 extracts the value D_pcr(x) of the dummy PCR from the dummy packet.

In the case in which the ordinary packet other than the dummy packets is received, the time irt(x)(n) of the input timer 304 is supplied to a subtracter 306 and the subtracter 306 calculates a difference (irt(x)(n)−idt(x)) between the arrival time idt(x) of a last dummy packet latched into the latch 305 and the arrival time irt(x)(n) of the input packet. The output of the subtracter 306 is supplied to a multiplier 307.

The time ratio information ratio extracted by the ratio extracting section 308 is supplied to the multiplier 307. The multiplier 307 multiplies the difference value (irt(x)(n)−idt(x)) between the arrival time of the last dummy packet and the arrival time of the input packet by the time ratio information ratio. The output of the multiplier 307 is supplied to an adder 315.

The value D_pcr(x) of the dummy PCR extracted by the PCR extracting section 309 is supplied to a latch 310. The output of the latch 310 is supplied to a latch 311 and to a subtracter 312. The output of the latch 310 is supplied to the subtracter 312.

The values D_pcr(x) and D_pcr(x−1) of the continuous dummy PCRs are latched into the latches 310 and 311. The subtracter 312 calculates a difference value (D_pcr(x)−D_pcr(x−1)) between the values of the continuous dummy PCRs.

The output of the subtracter 312 is supplied to an adder 313. The output of the adder 313 is supplied to a latch 314. The output time ort(x−1) of the last dummy packet is latched into the latch 314. The output of the latch 314 is supplied to the adder 313. Moreover, the output of the adder 313 is supplied to an adder 315 and to a selector 316.

The selector 316 is switched between the dummy packet and the other ordinary packets. In the case of the dummy packet, the selector 316 is set to a terminal 316a side and a time obtained from the output of the adder 313 is output from an output terminal 322. In the case of the ordinary packet, the selector 316 is switched into the terminal 316b side and a time obtained by the adder 315 is output from the output terminal 322.

In the case in which the input packet is the dummy PCR packet, the output time is calculated through the operation expressed in the above-mentioned equation (2).

More specifically, if it is decided that the input packet is a dummy packet through the packet analyzing section 302, the value D_pcr(x) of the dummy PCR is extracted by the PCR extracting section 309, the values D_pcr(x) and D_pcr(x−1) of the continuous dummy PCRs are fetched into the latches 310 and 311 and a difference diff between the value (D_pcr(x)) of the x-th dummy PCR and the value (D_pcr(x−1)) of the last dummy PCR is obtained by the subtracter 312:

$$diff = D\_pcr(x) - D\_pcr(x-1).$$

The output time odt(x−1) of the last dummy packet is latched into the latch 314. The adder 313 adds the output time odt(x−1) of the last dummy packet to the difference diff between the value (D_pcr(x)) of the x-th dummy PCR and the value (D_pcr(x−1)) of the last dummy PCR. Consequently, the following operation is carried out so that the output odt(x) of the x-th dummy PCR is obtained:

$$odt(x) = odt(x-1) + \mathit{diff} = odt(x-1) + (D\_pcr(x) - D\_pcr(x-1)).$$

The output time odt(x) of the x-th dummy PCR thus obtained is output as a time stamp from the output terminal 322 through the selector 316.

Moreover, in the case in which the input packet is a dummy packet, the adaptation field converting section 303 rewrites an adaptation field.

In the case in which the input packet is ordinary packets other than the dummy packet, the output time is calculated through the operation expressed in the equation (4).

More specifically, the latch 305 latches the time idt(x) at which the x-th dummy packet is input. The time irt(x)(n) at which the TS packet arrives is output from the input timer 304, and the subtracter 306 calculates a difference between the input arrival time irt (x)(n) of the packet and the input arrival time idt(x) of the x-th dummy packet.

$$irt(x)(n) - idt(x)$$

The multiplier 307 multiplies the difference between the input arrival time irt(x)(n) of the packet and the input arrival time idt(x) of the x-th dummy packet by the time ratio information ratio.

$$(irt(x)(n) - idt(x))\ \text{ratio}$$

The adder 315 adds the value (irt(x)(n)–idt(x)) ratio obtained by multiplying the difference between the input arrival time irt(x)(n) of the packet and the input arrival time idt(x) of the x-th dummy packet by the time ratio information ratio to the output time odt(x) of the x-th dummy packet sent from the adder 313.

Consequently, the following operation is carried out to calculate the output time ort(x)(n) of the n-th ordinary packet from the x-th dummy packet.

$$\begin{aligned} ort(x)(n) &= odt(x) + (irt(x)(n) - idt(x))\ \text{ratio} \\ &= odt(x-1) + (D\_pcr(x) - D\_pcr(x-1)) + \\ &\quad (irt(x)(n) - idt(x))\ \text{ratio} \end{aligned}$$

The output time idt(x)(n) of the x-th packet thus obtained is output as a time stamp from the output terminal 322 through the selector 316.

FIG. 13 shows an example of the case in which the output time is thus obtained and is added as a time stamp to the packet. In this example, the data on the contents are transmitted at a higher speed than a real time and the time ratio information is set to "2".

In FIG. 13, it is assumed that a dummy packet D_P(0) is input at a time "0", packets R_P(0)(0), R_P(0)(1), . . . are input at times "2", "4", . . . , a dummy packet D_P(1) is input at a time "16", and packets R_P(1)(0), R_P(1)(1), . . . are input at times "18", "20", . . . .

The dummy packet D_P(0) is input at the time "0". Therefore, "0" is fetched as the arrival time idt(0) during the input of the dummy packet D_P(0). The output time odt(0) of the dummy packet D_P(0) is set to "0".

Since the packets R_P(0)(0), R_P(0)(1), . . . are input at the times "2", "4", "2", "4" . . . are fetched as the arrival times irt(0)(0), irt(0)(1), . . . of the input times of the packets R_P(0)(0), R_P(0)(1), . . . , respectively.

The arrival time irt(0)(0) during the input of the packet R_P(0)(0) is "2". The time ratio information ratio is "2". Accordingly, the output time ort(0)(0) of the packet R_P(0)(0) is obtained as follows.

$$\begin{aligned} ort(0)(0) &= odt(0) + (irt(0)(0) - idt(0)) \times \text{ratio} \\ &= 0 + (2 - 0) \times 2 = 4 \end{aligned}$$

The arrival time ort(0)(1) during the output of the succeeding packet R_P(0)(1) is obtained as follows because the arrival time irt(0)(1) during the input of the packet R_P(0)(1) is "4".

$$\begin{aligned} ort(0)(1) &= odt(0) + (irt(0)(1) - idt(0)) \times \text{ratio} \\ &= 0 + (4 - 0) \times 2 = 8 \end{aligned}$$

The output times ort (0)(2), ort(0)(3), . . . of the packets R_P(0)(2), R_P(0)(3), are set to "12", "16", . . . .

The dummy packet D_P(1) is input at the time "16" Therefore, "16" is fetched as the arrival time idt(1) during the input of the dummy packet D_P(1).

The value of the dummy PCR added to the dummy packet D_P(1) is "32", and the value of the dummy PCR added to the last dummy packet D_P(0) is "0". Therefore, the value of diff is calculated as follows.

$$\mathit{diff} = 32 - 0 = 32$$

Accordingly, the output time odt(0) of the dummy packet D_P(0) is set to $$odt(0) = 0,$$

the output time odt1 of the dummy packet D_P(1) is calculated as follows:

$$\begin{aligned} odt(1) &= odt(0) + \mathit{diff} \\ &= 0 + 32 \\ &= 32 \end{aligned}$$

The packets R_P(1)(0), R_P(1)(1), . . . are input at times "18", "20", . . . , respectively. Therefore, "18", "20", . . . are fetched as the arrival times irt(1)(0), irt(1)(1), . . . during the input of the packets R_P(1)(0), R_P(1)(1), . . . , respectively.

The arrival time irt(1)(0) during the input of the packet R_P(1)(0) is "18". The time ratio information ratio is "2". Accordingly, the output time ort(1)(0) of the packet R_P(1)(0) is obtained as follows.

$$\begin{aligned} ort(1)(0) &= odt(1) + (irt(1)(0) - idt(1)) \times \text{ratio} \\ &= 32 + (18 - 16) \times 2 = 36 \end{aligned}$$

The output time ort(1)(1) of the succeeding packet R_P(1)(1) is obtained as follows because the arrival time irt(0)(1) during the input of the packet R_P(1)(1) is "20".

$$ort(1)(1) = odt(1) + (irt(1)(1) - idt(1)) \times \text{ratio}$$
$$= 32 + (20 - 16) \times 2 = 40$$

The output times ort(1)(2), ort(1)(3), . . . of the packets R_P(1)(2), R_P(1) (3), . . . are set to "44", "48", . . . .

The output times ort(0)(0), ort(0)(1), . . . , ort(1)(0), ort(1)(1), . . . thus obtained are added as time stamps to the TS packet.

As shown in FIG. 13, the output times of the packets R_P(0)(0), R_P(0)(1) . . . are calculated based on the difference values Δ1, Δ2, . . . with the time of the dummy packet D_P(0), and the output times of the packets R_P(1)(0), R_P(1)(1) . . . are calculated based on the difference values Δ11, Δ12, . . . with the time of the dummy packet D_P(1). The output time of the dummy packet is obtained by the dummy PCR. Therefore, an error is not accumulated in the output time. Consequently, every time the dummy packet arrives, the error of the output time is calibrated so that the error can be prevented from being accumulated.

Figure 14:
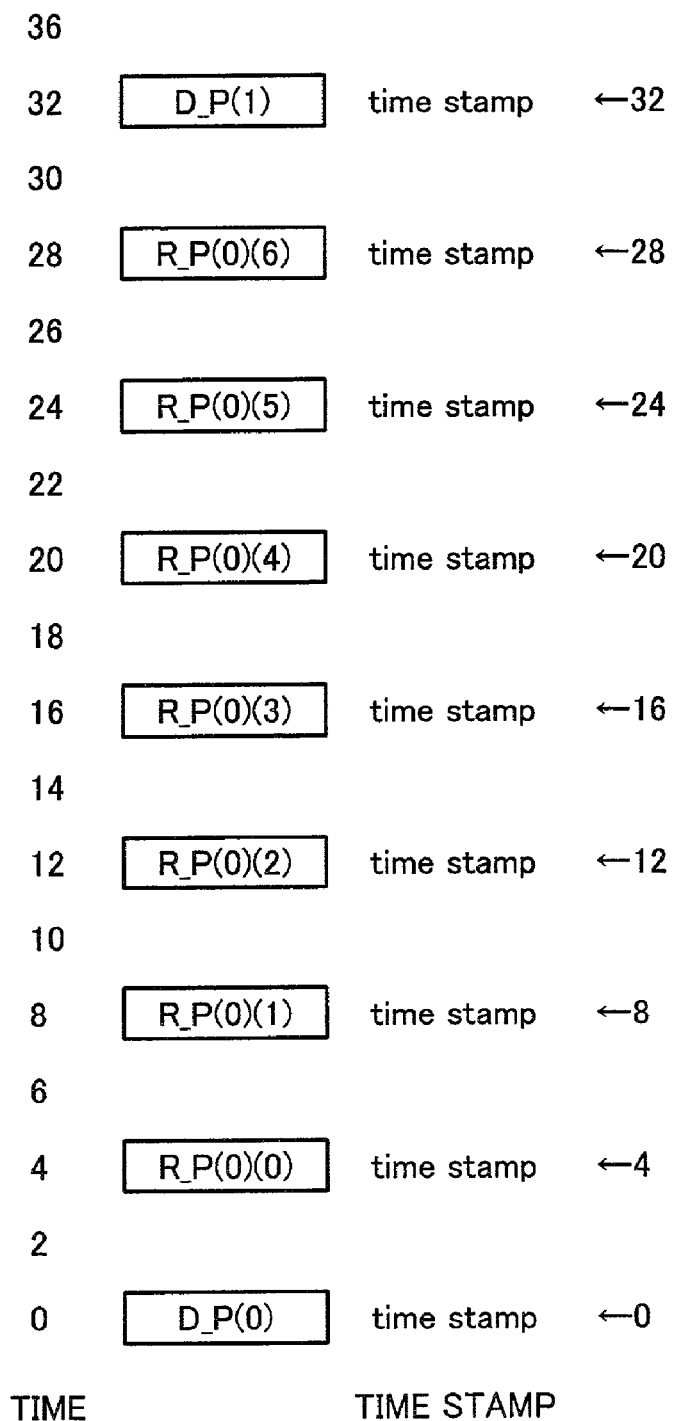
FIG. 14 is a schematic diagram to be used for explaining a further example of the time calculating section.

FIG. 14 shows a timing in which a time stamp is added and reproduced as shown in FIG. 13.

As shown in FIG. 14, a time stamp "0" is added to the packet D_P(0). Therefore, when the time "0" is set, the processing of the packet D_P(0) is carried out. Time stamps "4", "8", . . . are added to the packets R_P(0)(0), R_P(0)(1), . . . . Therefore, when the times "4", "8", . . . are set, the processings of the packets R_P(0)(0), R_P(0)(1), . . . are carried out.

Figure 15:
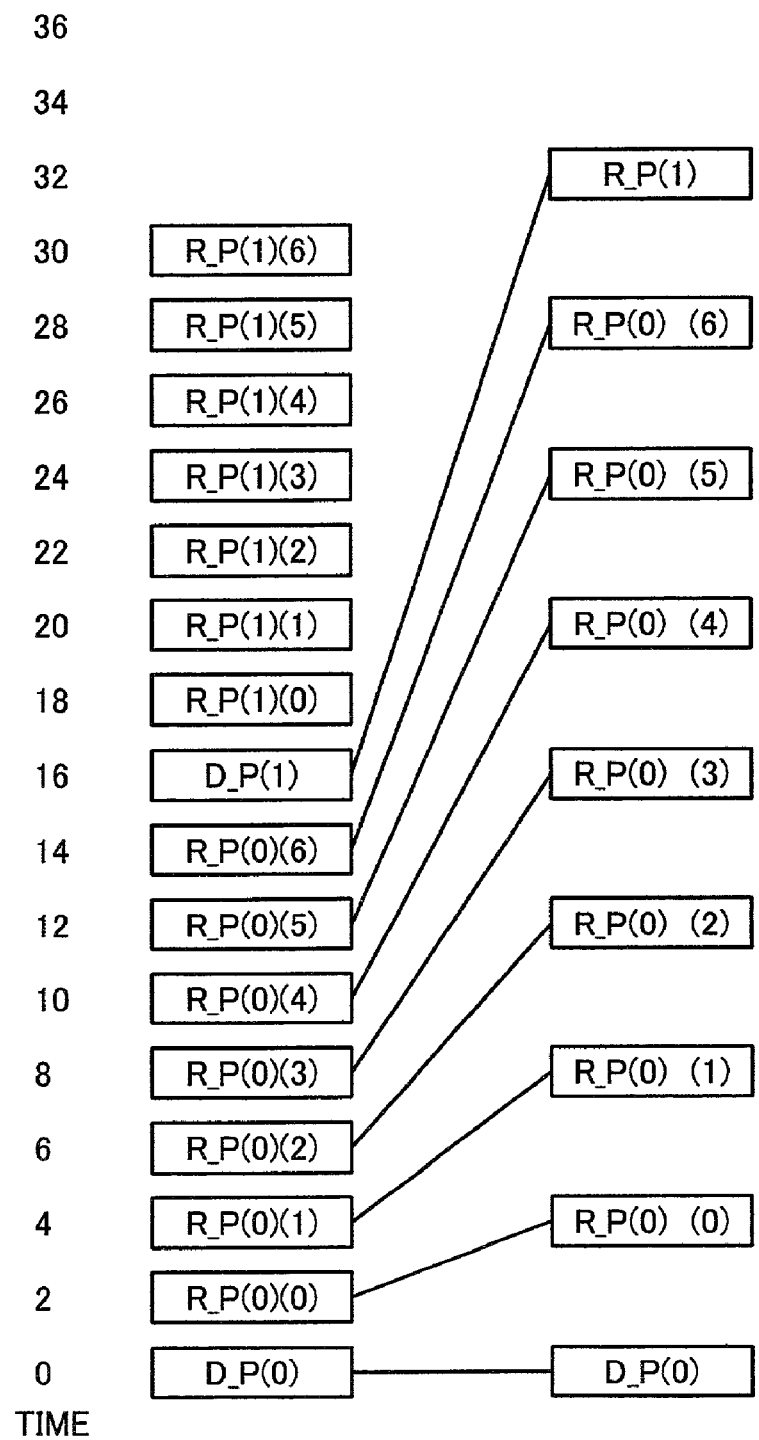
FIG. 15 is a schematic diagram to be used for explaining a further example of the time calculating section.

As shown in FIG. 15, consequently, the packets transmitted at the times "0", "2", "4", . . . during recording are processed at the times "0", "4", "8", . . . during reproduction. The contents transmitted at a higher speed than a real time are reproduced at a lower speed than the real time, and the reproduction is carried out in a time base based on the real time.

Figure 17:
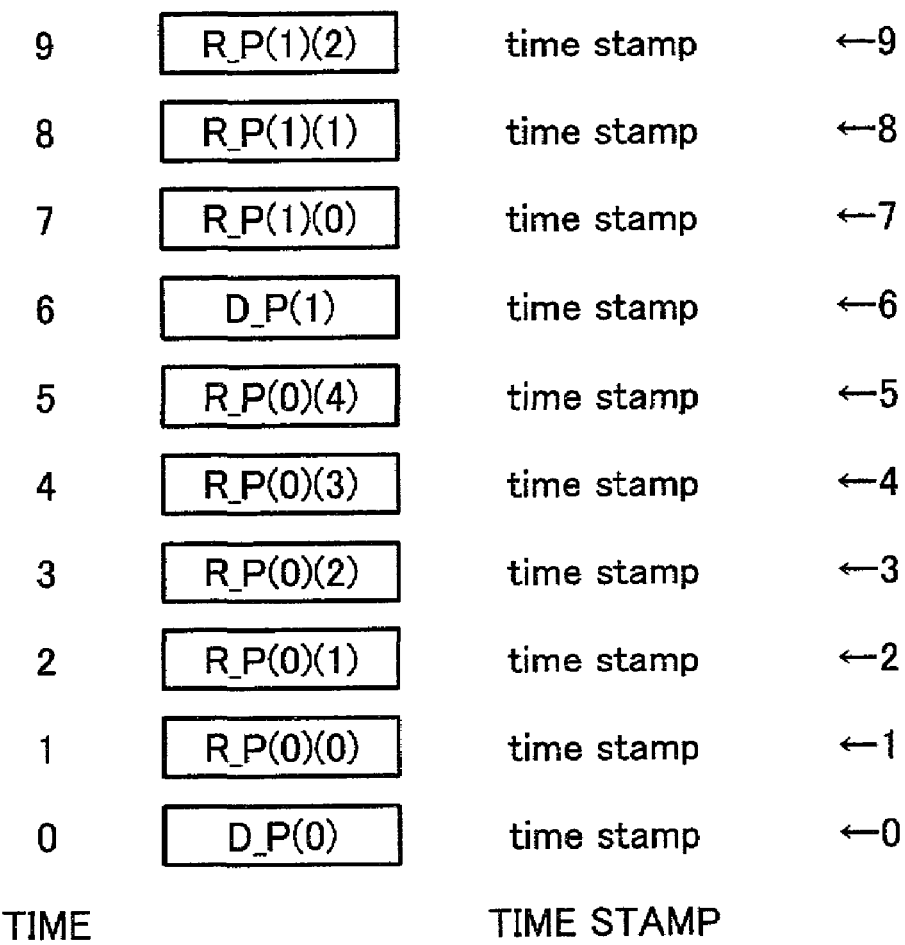
FIG. 17 is a schematic diagram to be used for explaining a further example of the time calculating section.
Figure 18:
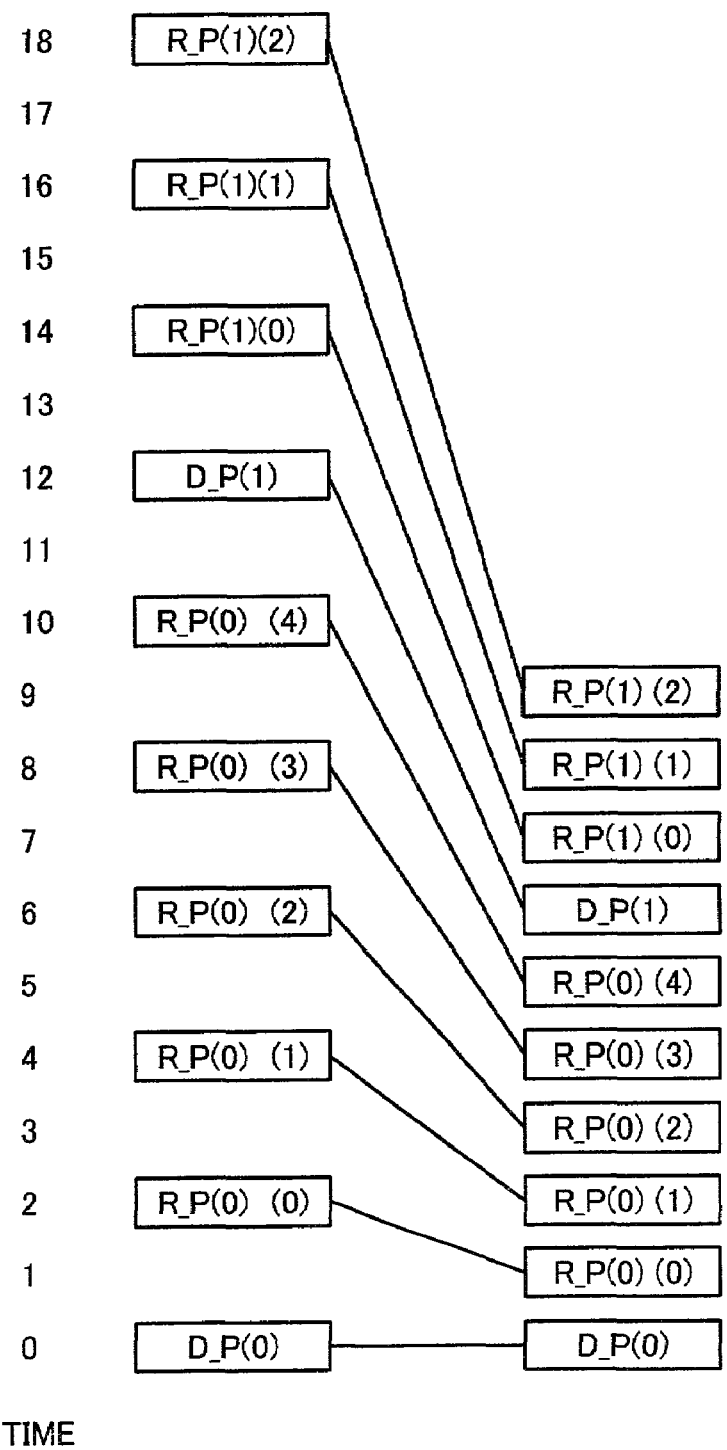
FIG. 18 is a schematic diagram to be used for explaining a further example of the time calculating section.

FIGS. 16 to 18 show an example in which information is delivered at a lower speed (a time ratio of ½) than the real time and is reproduced at a higher speed than the time required for the transmission corresponding to the real time during the reproduction.

In FIG. 16, it is assumed that a dummy packet D_P(0) is input at a time "0", packets R_P(0)(0), R_P(0)(1), . . . are input at times "2", "4", . . . a dummy packet D_P(1) is input at a time "12", and packets R_P(1)(0), R_P(1)(1), . . . are input at times "14", "16", . . . .

In this case, the time ratio information is (½). If the output time odt(0) of the dummy packet D_P(0) is set to (odt(0)=0) through the above-mentioned operation, the output time ort(0)(0) of the packet R_P(0)(0) is set to "1" and the arrival time ort(0)(1) during the output of the succeeding packet R_P(0)(1) is set to "2", and the output times ort(0)(2), ort(0)(3), . . . of the packets R_P(0)(2), R_P(0)(3), . . . are set to "3", "4", . . . .

Moreover, the output time of the dummy packet D_P(1) is set to "6" and the arrival times ort(1)(0), ort(1)(1) . . . during the output of the packets R_P(1)(0), R_P(1)(1), . . . are set to "7", "8", . . . .

The output time thus obtained is added as a time stamp to the TS packet and is recorded thereon.

FIG. 17 shows a timing for the reproduction. As shown in FIG. 17, a time stamp "0" is added to the packet D_P(0). Therefore, when the time "0" is set, the processing of the packet D_P(0) is carried out. Time stamps "1", "2", . . . are added to the packets R_P(0)(0), R_P(0)(1), . . . . Therefore, when the times "1", "2", . . . are set, the processings of the packets R_P(0)(0), R_P(0)(1), . . . are carried out.

As shown in FIG. 18, consequently, the packets transmitted at the times "0", "2", "4", . . . during recording are processed at the times "0", "1", "2" . . . during reproduction. The contents transmitted at a lower speed than a real time are reproduced at a higher speed than the real time, and the reproduction is carried out in a time base on the basis of the real time.

As described above, in the case in which the data on the contents are to be transmitted at a higher or lower speed than a real time in the system to which the present invention is applied, the dummy packet including the time ratio information and the dummy PCR is transmitted. The output time is calculated through an operation based on the time ratio information and the dummy PCR, and the output time thus obtained through the calculation is added as a time stamp. Consequently, also in the case in which the data on the contents are to be transmitted at a different speed from the real time, a time based on the real time can be restored.

While the time information during the output based on the real time is restored during the recording in the above-mentioned embodiment, a correct time base may be restored during the reproduction. More specifically, by exactly adding a time stamp in the time of the input timer during the recording, obtaining the time information during the output based on the real time from the dummy PCR of the dummy packet and the time ratio information during the reproduction and carrying out the reproduction in the timing of the time thus obtained, the data on the contents transmitted in a different time base from the real time may be reproduced in a correct time base.

While the data on the contents are to be transmitted when an empty band is generated on a transponder after an ordinary broadcast is completed at night in the above-mentioned embodiment, a special channel or program for transmitting the data on the contents may be provided.

Moreover, while the data on the contents are to be transmitted in the digital BS broadcast in the above-mentioned embodiment, the transmission of the data on the contents is not restricted to the digital BS broadcast. In a digital CS broadcast or a digital ground wave broadcast, similarly, the data on the contents can be transferred.

Furthermore, also in the case in which the data on the contents are to be transmitted through internet or various networks, the present invention can be applied in the same manner.

According to the present invention, there is prepared a dummy packet including an adaptation field having the value of a dummy PCR for restoring a real time and time ratio information of a transfer time and the real time.

During receipt, time information during output is obtained from the dummy PCR and the time ratio information. The time information during the output is added as a time stamp to a TS packet and is stored in a storage device such as a hard disk drive. During reproduction, data are read from the storage device by referring to the time stamp added during the recording. Consequently, the information about the contents transmitted in a different time base from the real time can be reproduced in a correct time base.

Alternatively, the TS packet having the time stamp added thereto is accumulated in the storage device such as a hard disk drive during the receipt. During the reproduction, time information during output based on a real time is obtained from the dummy PCR of the dummy packet and the time ratio information, and the reproduction is carried out in a timing of the time thus obtained. Consequently, the data on the contents transmitted in a different time base from the real time can be reproduced in a correct time base.

Thus, the information about the contents can be transmitted at a different speed from the real time. Consequently, it is possible to transmit the information about the contents for a long time by utilizing a limited time or to transmit the information about the contents in a small band.

In the present invention, moreover, the time during reproduction based on the real time can be obtained with a simple structure by latching the arrival time of the dummy packet and multiplying a difference between the arrival time of the dummy packet thus latched and the arrival time of an input packet by time ratio information.

In the present invention, furthermore, the time during reproduction based on the real time can be obtained by latching the arrival time of the dummy packet and multiplying a difference between the arrival time of the dummy packet thus latched and the arrival time of an input packet by time ratio information. Thus, the output time of the packet is calculated, and continuous dummy packets are acquired and the output time of the packet is calibrated based on the difference between the dummy PCRs included in the acquired dummy packet. Consequently, an error is not accumulated so that precision can be enhanced.

Numerous modifications and alternative embodiments of the present invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. An information terminal device for receiving data including predetermined contents delivered from a transmitting side, comprising:
   means for detecting time information from the received data;
   means for converting the detected time information into output time information indicative of a timing for outputting the predetermined contents,
   wherein the time information includes dummy reference time information indicative of a reference time during output and time ratio information indicative of a time ratio of a real time to a transfer time, and
   wherein the means for converting calculates output time information from the dummy reference time information and the time ratio information;
   means for recording at least the predetermined contents and the output time information; and
   means for controlling an output of the contents read from the recording means based on the output time information.

2. The information terminal device according to claim 1, wherein the converting means latches an arrival time of a dummy packet including the dummy reference time information and the time ratio information and multiplies a difference between the arrival time of the latched dummy packet and an arrival time of an input packet by the time ratio information, thereby calculating output time information of the packet.

3. The information terminal device according to claim 1, wherein the converting means latches an arrival time of a dummy packet including the dummy reference time information and the time ratio information and multiplies a difference between the arrival time of the latched dummy packet and an arrival time of an input packet by the time ratio information, thereby calculating output time information of the packet, and acquires continuous dummy packets and calibrates the output time information of the packet based on a difference in the dummy reference time information included in the continuous dummy packets.

4. A digital broadcast receiving device for receiving a broadcast signal, comprising:
   means for extracting digital data including predetermined contents from the received broadcast signal;
   means for detecting time information from the extracted digital data;
   means for converting the detected time information into output time information indicative of a timing for outputting the predetermined contents,
   wherein the time information includes dummy reference time information indicative of a reference time during output and time ratio information indicative of a time ratio of a real time to a transfer time, and
   wherein the means for converting calculates output time information from the dummy reference time information and the time ratio information;
   means for recording at least the predetermined contents and the output time information; and
   means for controlling an output of the contents read from the recording means based on the output time information.

5. The digital broadcast receiving device according to claim 4, wherein the converting means latches an arrival time of a dummy packet including the dummy reference time information and the time ratio information and multiplies a difference between the arrival time of the latched dummy packet and an arrival time of an input packet by the time ratio information, thereby calculating output time information of the packet.

6. The digital broadcast receiving device according to claim 4, wherein the converting means latches an arrival time of a dummy packet including the dummy reference time information and the time ratio information and multiplies a difference between the arrival time of the latched dummy packet and an arrival time of an input packet by the time ratio information, thereby calculating output time information of the packet, and acquires continuous dummy packets and calibrates the output time information of the packet based on a difference in the dummy reference time information included in the continuous dummy packets.

7. An information terminal receiving method for receiving data including predetermined contents delivered from a transmitting side, comprising the steps of:
   detecting time information from the received data;
   converting the detected time information into output time information indicative of a timing for outputting the predetermined contents,
   wherein the time information includes dummy reference time information indicative of a reference time during output and time ratio information indicative of a time ratio of a real time to a transfer time, and
   wherein the converting step calculates output time information from the dummy reference time information and the time ratio information;
   recording at least the predetermined contents and the output time information; and
   controlling an output of the contents based on the output time information.

8. The information terminal receiving method according to claim 7, wherein the conversion latches an arrival time of a dummy packet including the dummy reference time information and the time ratio information and multiplies a difference between the arrival time of the latched dummy packet and an arrival time of an input packet by the time ratio information, thereby calculating output time information of the packet.

9. The information terminal receiving method according to claim 7, wherein the conversion latches an arrival time of a dummy packet including the dummy reference time information and the time ratio information and multiplies a difference between the arrival time of the latched dummy packet and an arrival time of an input packet by the time ratio information, thereby calculating output time information of the packet, and acquires continuous dummy packets and calibrates the output time information of the packet based on a difference in the dummy reference time information included in the continuous dummy packets.

10. A digital broadcast receiving method for receiving a broadcast signal, comprising the steps of:

extracting digital data including predetermined contents from the received broadcast signal;

detecting time information from the extracted digital data;

converting the detected time information into output time information indicative of a timing for outputting the predetermined contents, wherein the time information includes dummy reference time information indicative of a reference time during output and time ratio information indicative of a time ratio of a real time to a transfer time, and wherein the converting step calculates output time information from the dummy reference time information and the time ratio information;

recording at least the predetermined contents and the output time information; and controlling read of the predetermined contents based on the output time information.

11. The digital broadcast receiving method according to claim 10, wherein the conversion latches an arrival time of a dummy packet including the dummy reference time information and the time ratio information and multiplies a difference between the arrival time of the packet including the latched dummy reference time information and the time ratio information and an arrival time of an input packet by the time ratio information, thereby calculating output time information of the packet.

12. The digital broadcast receiving method according to claim 10, wherein the conversion latches an arrival time of a dummy packet including the dummy reference time information and the time ratio information and multiplies a difference between the arrival time of the latched dummy packet and an arrival time of an input packet by the time ratio information, thereby calculating output time information of the packet, and acquires continuous dummy packets and calibrates the output time information of the packet based on a difference in the dummy reference time information included in the continuous dummy packets.

* * * * *